United States Patent
You et al.

(10) Patent No.: US 12,213,094 B2
(45) Date of Patent: Jan. 28, 2025

(54) METHOD FOR PROCESSING TIMING ADVANCE TA OF TERMINAL, AND APPARATUS

(71) Applicant: Huawei Technologies Co., Ltd., Shenzhen (CN)

(72) Inventors: Chunhua You, Shanghai (CN); Qufang Huang, Shenzhen (CN); Xiaoying Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 311 days.

(21) Appl. No.: 17/709,158

(22) Filed: Mar. 30, 2022

(65) Prior Publication Data

US 2022/0225254 A1 Jul. 14, 2022

Related U.S. Application Data

(63) Continuation of application No. PCT/CN2019/109687, filed on Sep. 30, 2019.

(51) Int. Cl.
*H04W 56/00* (2009.01)
*H04W 72/044* (2023.01)
(Continued)

(52) U.S. Cl.
CPC ....... *H04W 56/005* (2013.01); *H04W 56/001* (2013.01); *H04W 72/046* (2013.01);
(Continued)

(58) Field of Classification Search
None
See application file for complete search history.

(56) References Cited

U.S. PATENT DOCUMENTS

2018/0084546 A1* 3/2018 Guo .................. H04W 72/0446
2018/0198665 A1* 7/2018 Guo .................. H04W 56/0005
(Continued)

FOREIGN PATENT DOCUMENTS

CN 108024325 A 5/2018
CN 108377491 A 8/2018
(Continued)

OTHER PUBLICATIONS

"Report on email discussion [106#60] D-PUR TA validation criteria," 3GPP TSG-RAN WG2 #107, Prague, Czech Republic, Tdoc R2-1910435, Total 27 pages, 3rd Generation Partnership Project, Valbonne, France (Aug. 26-30, 2019).

(Continued)

*Primary Examiner* — Xavier S Wong
(74) *Attorney, Agent, or Firm* — Leydig, Voit & Mayer, Ltd.

(57) ABSTRACT

This application provides a method for processing timing advance (TA) of a terminal, and an apparatus. A terminal obtains a correspondence between first TA and a beam, determines, based on the correspondence, the beam corresponding to the first TA, and further determines, based on the beam corresponding to the first TA, whether the first TA is invalid. According to this application, the terminal may determine, by using a finer granularity, whether the first TA is invalid, and this helps trigger selection of more appropriate TA, thereby further reducing interference between uplink transmission.

20 Claims, 8 Drawing Sheets

501: A terminal obtains a correspondence between first TA and a TRP

502: The terminal determines, based on the correspondence, the TRP corresponding to the first TA 503: The terminal determines, based on the TRP corresponding to the first TA, whether the first TA is invalid

(51) Int. Cl.
*H04W 72/23* (2023.01)
*H04W 72/542* (2023.01)
*H04W 74/0833* (2024.01)

(52) U.S. Cl.
CPC ......... *H04W 72/23* (2023.01); *H04W 72/542* (2023.01); *H04W 74/0833* (2013.01)

(56) References Cited

U.S. PATENT DOCUMENTS

| | | | | |
|---|---|---|---|---|
| 2019/0116571 | A1* | 4/2019 | Yang | G01S 19/256 |
| 2019/0159156 | A1 | 5/2019 | Abedini et al. | |
| 2019/0215048 | A1* | 7/2019 | Cirik | H04W 76/19 |
| 2020/0136708 | A1* | 4/2020 | Pan | H04B 7/0408 |
| 2020/0373992 | A1* | 11/2020 | Wang | H04B 7/088 |
| 2021/0013948 | A1* | 1/2021 | Agiwal | H04W 80/02 |

FOREIGN PATENT DOCUMENTS

| | | |
|---|---|---|
| CN | 108702635 A | 10/2018 |
| CN | 109417765 A | 3/2019 |
| EP | 3346776 A1 | 7/2018 |
| WO | 2019086125 A1 | 5/2019 |

OTHER PUBLICATIONS

Samsung, "Discussions on NR UL multi-panel/multi-TRP," 3GPP TSG RAN WG1 Meeting #90, Prague, Czechia, R1-1713579, total 3 pages, 3rd Generation Partnership Project, Valbonne, France (Aug. 21-25, 2017).

"3rd Generation Partnership Project; Technical Specification Group Radio Access Network; Evolved Universal Terrestrial Radio Access (E-UTRA); Physical layer; Measurements (Release 15)," 3GPP TS 36.214 V15.4.0, total 25 pages, 3rd Generation Partnership Project, Valbonne, France (Sep. 2019).

* cited by examiner

METHOD FOR PROCESSING TIMING ADVANCE TA OF TERMINAL, AND APPARATUS

CROSS-REFERENCE TO RELATED APPLICATIONS

This application is a continuation of International Application No. PCT/CN2019/109687, filed on Sep. 30, 2019, the disclosure of which is hereby incorporated by reference in its entirety.

TECHNICAL FIELD

Embodiments of this application relate to the communication field, and more specifically, to a method for processing timing advance TA of a terminal, and an apparatus.

BACKGROUND

There is a latency in radio wave transmission. For example, a shorter distance between a network device and a terminal indicates a shorter transmission latency, and correspondingly, a longer distance between the network device and the terminal indicates a longer transmission latency. In uplink transmission, different terminals may perform orthogonal multiple access on time-frequency resources, so that there is no interference between uplink transmission of the different terminals from a same cell.

To implement orthogonality of uplink transmission, the network device requires that signals that are of the different terminals and that are on different frequency domain resources but from a same subframe arrive at the network device basically at the same time. For example, the network device can correctly perform decoding only when receiving, within a cyclic prefix (CP) range, uplink data sent by the different terminals. In other words, uplink synchronization requires that time points at which the signals that are of the different terminals and that are from the same subframe arrive at the network device fall within the CP. To ensure time synchronization on a network device side, an uplink timing advance (TA) mechanism is introduced in long term evolution (LTE) and new radio (NR). Specifically, a network device properly controls a time offset (TA) of uplink transmission of each terminal, to control time points at which uplink signals from different terminals arrive at the network device. For example, because of a relatively great transmission latency, a terminal that is far away from the network device needs to send uplink data more in advance than a terminal that is close to the network device.

In a conventional solution, when a terminal frequently moves, the terminal determines whether current TA is valid by determining whether a serving cell of the terminal changes. However, in NR, a requirement on a TA precision is increasingly high. How to more precisely determine whether current TA is valid, to reduce interference between uplink transmission, needs to be urgently resolved.

SUMMARY

This application provides a data transmission method, and an apparatus, to precisely determine whether TA is valid, and this reduces interference between uplink transmission.

According to a first aspect, a data transmission method is provided. The method includes: Obtaining a correspondence between first TA and a beam or a transmission reception point (TRP); determining, based on the correspondence, the beam or the TRP corresponding to the first TA; and determining, based on signal quality of the beam or the TRP, whether the first TA is invalid.

The terminal obtains the correspondence between the first TA and the beam, determines, based on the correspondence, the beam corresponding to the first TA, and further determines, based on the beam corresponding to the first TA, whether the first TA is invalid. In other words, in embodiments of this application, the terminal may determine, by using a finer granularity, whether the first TA is invalid, and this helps trigger selection of more appropriate TA. Therefore, compared with a conventional solution, embodiments of this application can further reduce interference between uplink transmission.

In some possible implementations, the determining whether the first TA is invalid includes: When the terminal moves out of coverage of the beam or the TRP corresponding to the first TA, determining that the first TA is invalid.

Each beam has specific coverage, for example, may cover a specific geographical location area. If the terminal moves out of coverage of a beam, the first TA may be invalid. In other words, the terminal may determine, based on that the terminal moves out of the coverage of the beam corresponding to the first TA, that the first TA is invalid, so that interference between uplink transmission can be reduced.

In some possible implementations, the method further includes: When the signal quality of the beam corresponding to the first TA is less than or equal to a preset threshold, determining that the terminal moves out of the coverage of the beam corresponding to the first TA, where the first TA corresponds to at least one beam; when a quantity of beams whose signal quality is greater than or equal to the preset threshold in a plurality of beams corresponding to the first TA is less than or equal to N, determining that the terminal moves out of the coverage of the beam corresponding to the first TA, where N is a positive integer; when a quantity of beams whose signal quality is less than or equal to the preset threshold in the plurality of beams corresponding to the first TA is greater than L, determining that the terminal moves out of the coverage of the beam corresponding to the first TA, where L is a positive integer; or when an average value of first S pieces of signal quality sorted in descending order of signal quality in the plurality of beams corresponding to the first TA is less than or equal to the preset threshold, determining that the terminal moves out of the coverage of the beam corresponding to the first TA, where S is a positive integer.

If the average value of the S pieces of signal quality that are higher in signal quality of the plurality of beams corresponding to the first TA is less than or equal to the preset threshold, it is determined that the terminal moves out of the coverage of the beam corresponding to the first TA. To be specific, the S pieces of high signal quality are selected from the signal quality of the plurality of beams, and are then compared with the preset threshold, to determine whether the terminal moves out of the coverage of the beam corresponding to the first TA. In other words, a method for determining whether the terminal moves out of the coverage of the beam corresponding to the first TA is provided. In this way, it can further be determined, based on that the terminal moves out of the coverage of the beam corresponding to the first TA, that the first TA is invalid, thereby reducing interference between uplink transmission.

In some possible implementations, the method further includes: When signal quality of a beam associated with the TRP corresponding to the first TA is less than or equal to a preset threshold, determining that the terminal moves out of the coverage of the TRP corresponding to the first TA, where the beam associated with the TRP is at least one beam; when a quantity of beams whose signal quality is greater than or equal to the preset threshold in a plurality of beams associated with the TRP corresponding to the first TA is less than or equal to N, determining that the terminal moves out of the coverage of the TRP corresponding to the first TA, where N is an integer; when a quantity of beams whose signal quality is less than or equal to the preset threshold in the plurality of beams associated with the TRP corresponding to the first TA is greater than or equal to L, determining that the terminal moves out of the coverage of the TRP corresponding to the first TA, where L is a positive integer; or when an average value of first S pieces of signal quality sorted in descending order of signal quality in the plurality of beams associated with the TRP corresponding to the first TA is less than or equal to the preset threshold, determining that the terminal moves out of the coverage of the TRP corresponding to the first TA, where S is a positive integer.

If the average value of the S pieces of signal quality that are higher in signal quality of the plurality of beams associated with the TRP corresponding to the first TA is less than or equal to the preset threshold, it is determined that the terminal moves out of the coverage of the TRP corresponding to the first TA. In other words, the S pieces of high signal quality are selected from the signal quality of the plurality of beams. For example, the signal quality of the plurality of beams may be sorted in descending order. The first S pieces of signal quality are selected, and compared with the preset threshold, to determine whether the terminal moves out of the coverage of the beam corresponding to the first TA. In other words, a method for determining whether the terminal moves out of the coverage of the TRP corresponding to the first TA is provided. In this way, it can further be determined, based on that the terminal moves out of the coverage of the TRP corresponding to the first TA, that the first TA is invalid, thereby reducing interference between uplink transmission.

In some possible implementations, the determining whether the TA is invalid includes: when a variation of signal quality of a plurality of beams corresponding to the first TA or a plurality of beams associated with the TRP corresponding to the first TA is greater than a first preset threshold, determining that the first TA is invalid; when there is another beam whose signal quality is greater than the signal quality of the beam corresponding to the first TA or the beam associated with the TRP corresponding to the first TA, determining that the first TA is invalid; or when there is another beam whose signal quality is greater than or equal to a second preset threshold, determining that the first TA is invalid.

If the variation of the signal quality of the beam corresponding to the first TA or the plurality of beams associated with the TRP corresponding to the first TA is greater than the first preset threshold, the terminal moves relatively fast, and a location is updated relatively fast. As a result, the first TA may be inaccurate (that is, the first TA is invalid). Therefore, if the terminal detects that the variation of the signal quality is greater than the preset threshold, it may be considered that the first TA is invalid. This further helps trigger the terminal to select more appropriate TA, and this further reduces interference between uplink transmission.

In some possible implementations, the method further includes: When a variation of a difference between signal quality of a first beam in the plurality of beams corresponding to the first TA or the plurality of beams associated with the TRP corresponding to the first TA and signal quality of a second beam is greater than or equal to the first preset threshold, determining that a variation of the signal quality of the beam corresponding to the first TA is greater than the first preset threshold; or when a variation of the signal quality of the first beam in the plurality of beams corresponding to the first TA or the plurality of beams associated with the TRP corresponding to the first TA is greater than or equal to the first preset threshold, determining that the variation of the signal quality of the beam corresponding to the first TA is greater than the first preset threshold.

The first TA corresponds to a plurality of beams, and the variation of the signal quality of the plurality of beams may be specifically a variation of a difference between signal quality of any two beams in the plurality of beams. In other words, when the variation between the signal quality of the any two beams is greater than the first preset threshold, the terminal may consider that the variation of the signal quality of the plurality of beams corresponding to the first TA is greater than the first preset threshold, and further consider that the first TA is invalid. This helps trigger the terminal to select more appropriate TA, and this further reduces interference between uplink transmission.

When a variation of signal quality of any one of the plurality of beams is greater than the first preset threshold, the terminal may consider that the variation of the signal quality of the plurality of beams corresponding to the first TA is greater than the first preset threshold, and further consider that the first TA is invalid. This helps trigger the terminal to select more appropriate TA, and this further reduces interference between uplink transmission.

In some possible implementations, the obtaining a correspondence between TA and a beam or a TRP includes: Obtaining the correspondence from a network device.

The terminal may directly receive the correspondence from the network device, and this improves flexibility of configuring the correspondence by the network device.

In some possible implementations, the obtaining the correspondence from a network device includes: Receiving indication information from the network device, where the indication information is used to indicate a beam list corresponding to the first TA, the beam list includes an identifier of at least one beam, or is used to indicate the TRP corresponding to the first TA, and the TRP is associated with at least one beam.

The terminal may indirectly obtain the correspondence between the first TA and the beam based on the indication information. This avoids occupation of relatively large resources when the correspondence is directly sent, and reduces resource overheads.

In some possible implementations, the identifier of the beam includes a beam index, a synchronization signal block SSB index, or a channel state information reference signal CSI-RS identifier.

In some possible implementations, the method further includes: Initiating random access when the first TA is invalid, and sending reason information to the network device in a random access process, where the reason information is used to indicate a reason for initiating the random access.

The reason information may be carried in a random access request. In this way, the network device may configure new TA for the terminal based on the reason information, so that the terminal can obtain more appropriate TA, and interference between uplink transmission is further reduced.

In some possible implementations, the reason includes that the TA is invalid, or that a configured grant resource is cleared.

In some possible implementations, the initiating random access includes: Sending the random access request; receiving a response message for the random access request, where the response message includes second TA and indication information, and the indication information indicates a beam or a TRP corresponding to the second TA, or a TRP or a beam on which the response message is located is a beam or a TRP corresponding to the second TA; and performing uplink transmission by using the second TA.

When configuring the second TA for the terminal, the network device also adds, to the beam list, the beam corresponding to the second TA. In this way, the terminal can subsequently determine, based on the beam list, the beam corresponding to the second TA, to determine whether the second TA is invalid, and interference between subsequent uplink transmission is reduced.

In some possible implementations, the method further includes: Receiving a broadcast message, where the broadcast message includes a plurality of beam lists or information about a plurality of TRPs, and the indication information is used to indicate one of the plurality of beam lists or one of the plurality of TRPs.

The indication information may be one of the plurality of beam lists. In other words, the network device may identify the beam list in advance by using the broadcast message, and then directly indicate the beam identifier by using the indication information, so that the terminal can learn of the beam corresponding to the second TA.

In some possible implementations, the method further includes: When the first TA is invalid, releasing the configured grant resource corresponding to the first TA.

When the first TA is invalid, the terminal may further release the configured grant resource of the beam corresponding to the first TA. In this way, a resource waste can be avoided, and resource utilization can be improved.

According to a second aspect, a method for processing timing advance TA of a terminal is provided. The method includes: Determining a correspondence between first TA and a beam or a transmission reception point TRP; and sending the correspondence.

A network device determines the correspondence between the first TA and the beam, and sends the correspondence to the terminal, so that the terminal can determine, based on the correspondence, the beam corresponding to the first TA, and further determine, based on the beam corresponding to the first TA, whether the first TA is invalid. In other words, in embodiments of this application, the terminal may determine, by using a finer granularity, whether the first TA is invalid, and this helps trigger selection of more appropriate TA. Therefore, compared with a conventional solution, embodiments of this application can further reduce interference between uplink transmission.

In some possible implementations, the method further includes: Sending indication information, where the indication information is used to indicate a beam list corresponding to the first TA, the beam list includes an identifier of at least one beam, or is used to indicate the TRP corresponding to the first TA, and the TRP is associated with at least one beam.

The terminal may indirectly obtain the correspondence between the first TA and the beam based on the indication information. This avoids occupation of relatively large resources when the correspondence is directly sent, and reduces resource overheads.

In some possible implementations, the identifier of the beam includes a beam index, a synchronization signal block SSB index, or a channel state information reference signal CSI-RS identifier.

In some possible implementations, the method further includes: Receiving reason information in a random access process of the terminal, where the reason information is used to indicate a reason for initiating the random access.

The reason information may be carried in a random access request. In this way, the network device may configure new TA for the terminal based on the reason information, so that the terminal can obtain more appropriate TA, and interference between uplink transmission is further reduced.

In some possible implementations, the reason includes that the first TA is invalid, or that a configured grant resource is cleared.

In some possible implementations, the method further includes: Receiving the random access request; and sending a response message for the random access request, where the response message includes second TA and indication information, and the indication information indicates a beam or a TRP corresponding to the second TA, or a TRP or a beam on which the response message is located is a beam or a TRP corresponding to the second TA.

When configuring the second TA for the terminal, the network device also adds, to the beam list, the beam corresponding to the second TA. In this way, the terminal can subsequently determine, based on the beam list, the beam corresponding to the second TA, to determine whether the second TA is invalid, and interference between subsequent uplink transmission is reduced.

In some possible implementations, the method further includes: Sending a broadcast message, where the broadcast message includes a plurality of beam lists or information about a plurality of TRPs, and the indication information is used to indicate one of the plurality of beam lists or one of the plurality of TRPs.

The indication information may be one of the plurality of beam lists. In other words, the network device may identify the beam list in advance by using the broadcast message, and then directly indicate the beam identifier by using the indication information, so that the terminal can learn of the beam corresponding to the second TA.

According to a third aspect, an apparatus for processing timing advance TA of a terminal is provided. The apparatus may be the terminal, or a chip used in the terminal, for example, a chip that may be disposed in the terminal. The apparatus has a function of implementing the first aspect and the possible implementations of the first aspect. The function may be implemented by hardware, or may be implemented by hardware executing corresponding software. The hardware or the software includes one or more modules corresponding to the foregoing function.

In a possible design, the apparatus includes a processing module and a transceiver module. The transceiver module may be, for example, at least one of a transceiver, a receiver, and a transmitter. The transceiver module may include a receiving module and a sending module, and may specifically include a radio frequency circuit or an antenna. The processing module may be a processor. Optionally, the apparatus further includes a storage module, and the storage module may be, for example, a memory. When the apparatus includes the storage module, the storage module is configured to store instructions. The processing module is connected to the storage module, and the processing module may execute the instructions stored in the storage module or instructions from another module, to enable the apparatus to perform the communication method according to any one of the first aspect or the possible implementations of the first aspect. In this design, the apparatus may be a terminal.

In another possible design, when the apparatus is a chip, the chip includes a processing module and a transceiver module. The transceiver module may be, for example, an input/output interface, a pin, or a circuit in the chip. The processing module may be, for example, a processor. The processing module may execute instructions, to enable the chip in the terminal to perform the communication method according to any one of the first aspect and the possible implementations thereof. Optionally, the processing module may execute instructions in a storage module, and the storage module may be a storage module in the chip, for example, a register or a buffer. The storage module may alternatively be located inside a communication device but outside the chip, for example, a read-only memory (ROM) or another type of static storage device that can store static information and instructions, or a random access memory (RAM).

The processor mentioned anywhere above may be a general-purpose central processing unit (CPU), a microprocessor, an application-specific integrated circuit (ASIC), or one or more integrated circuits configured to control program execution of the method according to any one of the first aspect or the possible implementations of the first aspect.

According to a fourth aspect, an apparatus for processing timing advance TA of a terminal is provided. The apparatus may be a network device, or a chip used in the network device, for example, a chip that may be disposed in the network device. The apparatus has a function of implementing the second aspect and the possible implementations. The function may be implemented by hardware, or may be implemented by hardware executing corresponding software. The hardware or the software includes one or more modules corresponding to the foregoing function.

In a possible design, the apparatus includes a transceiver module and a processing module. The transceiver module may be, for example, at least one of a transceiver, a receiver, and a transmitter. The transceiver module may include a receiving module and a sending module, and may specifically include a radio frequency circuit or an antenna. The processing module may be a processor.

Optionally, the apparatus further includes a storage module, and the storage module may be, for example, a memory. When the apparatus includes the storage module, the storage module is configured to store instructions. The processing module is connected to the storage module, and the processing module may execute the instructions stored in the storage module or instructions from another module, so that the apparatus performs the method according to any one of the second aspect or the possible implementations thereof.

In another possible design, when the apparatus is a chip, the chip includes a transceiver module and a processing module. The transceiver module may be, for example, an input/output interface, a pin, or a circuit in the chip. The processing module may be, for example, a processor. The processing module may execute instructions, to enable the chip in the network device to perform the communication method according to any one of the second aspect or the possible implementations thereof.

Optionally, the processing module may execute instructions in a storage module, and the storage module may be a storage module in the chip, for example, a register or a buffer. The storage module may alternatively be located inside a communication device but outside the chip, for example, a read-only memory (ROM) or another type of static storage device that can store static information and instructions, or a random access memory (RAM).

The processor mentioned above may be a general-purpose central processing unit (CPU), a microprocessor, an application-specific integrated circuit (ASIC), or one or more integrated circuits configured to control program execution of the method in the second aspect.

According to a fifth aspect, an apparatus is provided, including a module configured to implement the method according to any one of the first aspect or the possible implementations of the first aspect.

According to a sixth aspect, an apparatus is provided, including a module configured to implement the method according to any one of the second aspect or the possible implementations of the second aspect.

According to a seventh aspect, an apparatus is provided, including a processor, configured to invoke a program stored in a memory, to perform the method according to any one of the first aspect or the possible implementations of the first aspect.

According to an eighth aspect, an apparatus is provided, including a processor, configured to invoke a program stored in a memory, to perform the method according to any one of the second aspect or the possible implementations of the second aspect.

According to a ninth aspect, an apparatus is provided, including a processor and an interface circuit, where the processor is configured to communicate with another apparatus by using the interface circuit, and perform the method according to any one of the first aspect or the possible implementations of the first aspect.

According to a tenth aspect, an apparatus is provided, including a processor and an interface circuit, where the processor is configured to communicate with another apparatus by using the interface circuit, and perform the method according to any one of the second aspect or the possible implementations of the second aspect.

According to an eleventh aspect, a terminal is provided, including the apparatus according to any one of the fifth aspect, the seventh aspect, the ninth aspect, or the possible implementations of the fifth aspect, the seventh aspect, or the ninth aspect.

According to a twelfth aspect, a network device is provided, including the apparatus according to any one of the sixth aspect, the eighth aspect, the tenth aspect, or the possible implementations of the sixth aspect, the eighth aspect, or the tenth aspect.

According to a thirteenth aspect, a computer storage medium is provided, where the computer storage medium stores instructions, and when the instructions are run, the method according to any one of the first aspect or the possible implementations of the first aspect is implemented.

According to a fourteenth aspect, a computer storage medium is provided, where the computer storage medium stores instructions, and when the instructions are run, the method according to any one of the second aspect or the possible implementations of the second aspect is implemented.

According to a fifteenth aspect, a computer storage medium is provided. The computer storage medium stores program code, and the program code is used to indicate instructions for performing the method according to any one of the first aspect or the possible implementations of the first aspect.

According to a sixteenth aspect, a computer storage medium is provided. The computer storage medium stores program code, and the program code is used to indicate instructions for performing the method according to any one of the second aspect or the possible implementations of the second aspect.

According to a seventeenth aspect, a computer program product including instructions is provided. When the computer program product runs on a processor, a computer is enabled to perform the method according to any one of the first aspect or the possible implementations of the first aspect.

According to an eighteenth aspect, a computer program product including instructions is provided. When the computer program product runs on a processor, a computer is enabled to perform the method according to any one of the second aspect or the possible implementations of the second aspect.

According to a nineteenth aspect, a communication system is provided. The communication system includes an apparatus that has a function of implementing the method and various possible designs according to the first aspect and an apparatus that has a function of implementing the method and various possible designs according to the second aspect.

Based on the foregoing technical solutions, the terminal obtains the correspondence between the first TA and the beam, determines, based on the correspondence, the beam corresponding to the first TA, and further determines, based on the beam corresponding to the first TA, whether the first TA is invalid. In other words, in embodiments of this application, the terminal may determine, by using a finer granularity, whether the first TA is invalid, and this helps trigger selection of more appropriate TA. Therefore, compared with a conventional solution, embodiments of this application can further reduce interference between uplink transmission.

DESCRIPTION OF EMBODIMENTS

Figure 1:
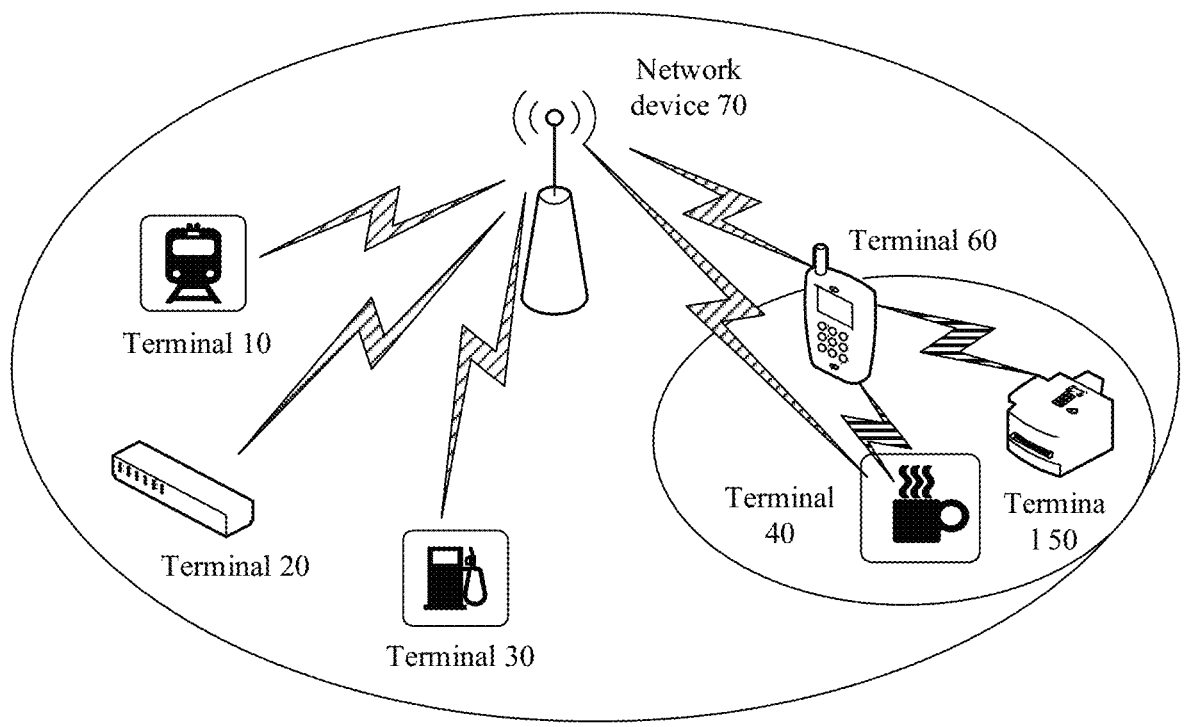
FIG. 1 is a schematic diagram of a communication system according to this application.

The following describes technical solutions in this application with reference to the accompanying drawings.

The technical solutions in embodiments of this application may be applied to various communication systems, for example, a long term evolution (LTE) system, an LTE frequency division duplex (FDD) system, an LTE time division duplex (TDD) system, a 5th generation (5G) system, a new radio (NR) system, and a future mobile communication system.

A terminal in embodiments of this application may be a device that has a wireless transceiver function, and may be referred to as a terminal, user equipment (UE), a mobile station (MS), a mobile terminal (MT), a vehicle-mounted terminal, a remote station, a remote terminal, or the like. A specific form of the terminal may be a mobile phone, a cellular phone, a cordless phone, a session initiation protocol (SIP) phone, a wearable device, a tablet computer, a desktop computer, a notebook computer, an all-in-one machine, a vehicle-mounted terminal, a wireless local loop (WLL) station, a personal digital assistant (PDA), or the like. The terminal may be used in the following scenario: virtual reality (VR), augmented reality (AR), industrial control, self driving, remote surgery, a smart grid, transportation safety, a smart city, a smart home, or the like. The terminal may be fixed or movable. It should be noted that the terminal may support at least one wireless communication technology, such as LTE, NR, or wideband code division multiple access (WCDMA).

A network device in embodiments of this application may be a device that provides a wireless communication function for the terminal, and may also be referred to as a radio access network (RAN) device or the like. The network device includes but is not limited to: a next-generation NodeB (gNB) in 5G, an evolved NodeB (eNB), a baseband unit (BBU), a transmission reception point (TRP), a transmission point (TP), a relay station, an access point, and the like. The network device may alternatively be a radio controller, a central unit (CU), a distributed unit (DU), or the like in a cloud radio access network (CRAN) scenario. The network device may support at least one wireless communication technology, such as LTE, NR, or WCDMA.

In some deployments, the gNB may include a centralized unit CU and a DU. The gNB may further include an active antenna unit (AAU). The CU implements some functions of the gNB, and the DU implements some functions of the gNB. For example, the CU is responsible for processing a non-real-time protocol and service, and implementing functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer eventually becomes information at the PHY layer, or is changed from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (RAN), or may be classified into a network device in a core network (CN). This is not limited in this application.

In embodiments of this application, the terminal or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not specifically limited in embodiments of this application, provided that a program that records code of the method provided in embodiments of this application can be run to perform communication according to the method provided in embodiments of this application. For example, the execution body of the method provided in embodiments of this application may be the terminal or the network device, or may be a functional module that can invoke the program and execute the program in the terminal or the network device.

In addition, aspects or features of this application may be implemented as a method, an apparatus, or a product that uses standard programming and/or engineering technologies. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to radio channels and various other media that can store, include, and/or carry instructions and/or data.

The network device and the terminal may be deployed on land, including indoor or outdoor and handheld or vehicle-mounted devices and terminals, or may be deployed on water, or may be deployed on an airplane, a balloon, or a satellite in the air. An application scenario of the radio access network device and the terminal is not limited in embodiments of this application.

To facilitate understanding of the technical solutions in this application, terms in this application are first briefly described.

Beam:

The beam is a communication resource. The beam may be a wide beam, a narrow beam, or another type of beam. A technology for forming the beam may be a beamforming technology or another technical means. The beamforming technology may be specifically a digital beamforming technology, an analog beamforming technology, or a hybrid digital/analog beamforming technology. Different beams may be considered as different resources. Same information or different information may be transmitted by using different beams. Optionally, a plurality of beams having a same communication characteristic or similar communication characteristics may be considered as one beam. One beam may include one or more antenna ports, configured to transmit a data channel, a control channel, a sounding signal, and the like. For example, a transmit beam may be distribution of signal strength formed in different directions in space after a signal is transmitted by using an antenna, and a receive beam may be distribution of signal strength, in different directions in space, of a radio signal received from an antenna. It may be understood that one or more antenna ports forming one beam may also be considered as one antenna port set. In a protocol, the beam may also be embodied as a spatial filter.

Beamforming Technology:

The beamforming technology may be used to implement a higher antenna array gain by sending or receiving a signal in a specific direction in space. Analog beamforming may be implemented by using a radio frequency. For example, a phase of a radio frequency chain (RF chain) is adjusted by using a phase shifter, to control a change in a direction of an analog beam. Therefore, one RF chain can generate only one analog beam at a same moment.

FIG. 1 is a schematic diagram of a communication system according to this application. The communication system in FIG. 1 may include at least one terminal (for example, a terminal 10, a terminal 20, a terminal 30, a terminal 40, a terminal 50, and a terminal 60) and a network device 70. The network device 70 is configured to provide a communication service for the terminal and access a core network. The terminal may access a network by searching for a synchronization signal, a broadcast signal, or the like sent by the network device 70, to communicate with the network. The terminal 10, the terminal 20, the terminal 30, the terminal 40, and the terminal 60 in FIG. 1 may perform uplink and downlink transmission with the network device 70. For example, the network device 70 may send downlink signals to the terminal 10, the terminal 20, the terminal 30, the terminal 40, and the terminal 60, or may receive uplink signals sent by the terminal 10, the terminal 20, the terminal 30, the terminal 40, and the terminal 60.

In addition, the terminal 40, the terminal 50, and the terminal 60 may also be considered as a communication system. The terminal 60 may send signals to the terminal 40 and the terminal 50, or may receive signals sent by the terminal 40 and the terminal 50. In other words, embodiments of this application may be applied to downlink signal transmission, or may be applied to uplink signal transmission, or may be applied to device-to-device (D2D) signal transmission. For the downlink signal transmission, a sending device is a network device, and a corresponding receiving device is a terminal. For the uplink signal transmission, a sending device is a terminal, and a corresponding receiving device is a network device. For the D2D signal transmission, a sending device is a terminal, and a corresponding receiving device is also a terminal. A signal transmission direction is not limited in embodiments of this application.

It should be noted that embodiments of this application may be applied to a communication system including one or more network devices, or may be applied to a communication system including one or more terminals. This is not limited in this application. One network device may send data or control signaling to one or more terminals. A plurality of network devices may simultaneously send data or control signaling to one or more terminals.

It should further be noted that communication between the network device and the terminal and between the terminals may be performed by using a licensed spectrum, or an unlicensed spectrum, or both the licensed spectrum and the unlicensed spectrum. Communication between the network device and the terminal and between the terminals may be performed by using a spectrum below 6G, or a spectrum above 6G, or both the spectrum below 6G and the spectrum above 6G. A spectrum resource used between the network device and the terminal is not limited in embodiments of this application.

Figure 2:
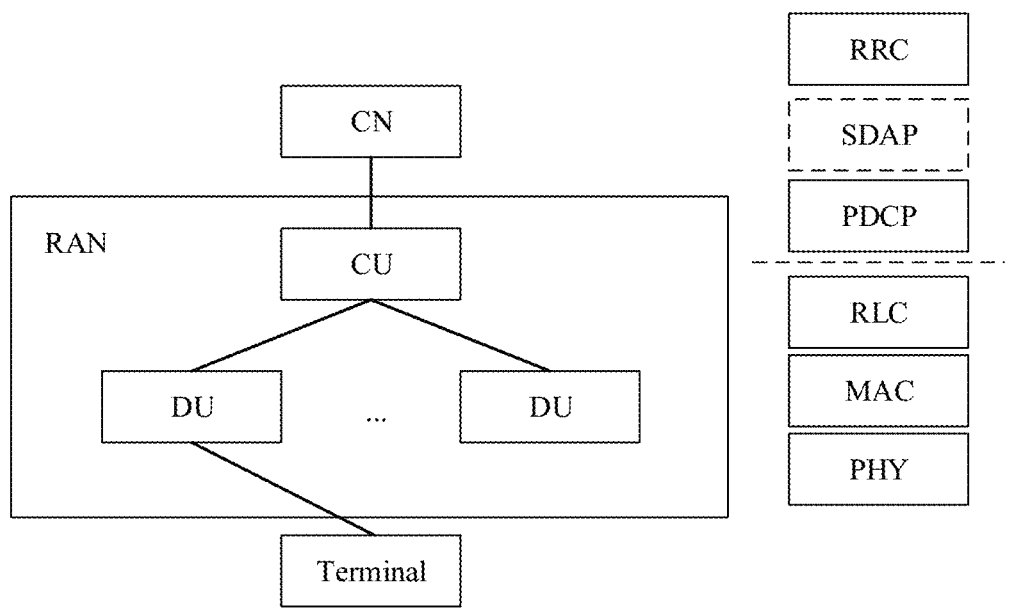
FIG. 2 is a schematic diagram of a specific communication architecture according to this application.

FIG. 2 is a schematic diagram of a network architecture according to an embodiment of this application. The network architecture includes a compression end (CN) device and a RAN device. The RAN device includes a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus, or a part of the radio frequency apparatus is implemented remotely from the baseband apparatus and a remaining part is integrated into the baseband apparatus. For example, in an LTE communication system, a RAN device (eNB) includes a baseband apparatus and a radio frequency apparatus. The radio frequency apparatus may be remotely disposed relative to the baseband apparatus. For example, a remote radio unit (RRU) is remotely disposed relative to a BBU. Communication between the RAN device and a terminal complies with a specific protocol layer structure. For example, a control plane protocol layer structure may include functions of protocol layers such as a radio resource control (RRC) layer, a packet data convergence protocol (PDCP) layer, a radio link control (RLC) layer, a media access control (MAC) layer, and a physical layer. A user plane protocol layer structure may include functions of protocol layers such as a PDCP layer, an RLC layer, a MAC layer, and a physical layer. In an implementation, a service data adaptation protocol (SDAP) layer is further included above the PDCP layer.

The functions of these protocol layers may be implemented by one node, or may be implemented by a plurality of nodes. For example, in an evolved structure, a RAN device may include a centralized unit (CU) and a distributed unit (DU). A plurality of DUs may be centrally controlled by one CU. As shown in FIG. 2, the CU and the DU may be obtained through division based on a protocol layer of a wireless network. For example, functions of the PDCP layer and layers above the PDCP layer are deployed on the CU, and functions of protocol layers below the PDCP layer, such as the RLC layer and the MAC layer, are deployed on the DU.

Division based on the protocol layer is merely an example, and division may alternatively be performed based on another protocol layer, such as the RLC layer. Functions of the RLC layer and protocol layers above the RLC layer are deployed on the CU, and functions of protocol layers below the RLC layer are deployed on the DU. Alternatively, division is performed at a protocol layer. For example, some functions of the RLC layer and functions of protocol layers above the RLC layer are deployed on the CU, and a remaining function of the RLC layer and functions of protocol layers below the RLC layer are deployed on the DU. In addition, division may alternatively be performed in another manner. For example, the division is performed based on a latency. A function whose processing time needs to satisfy a latency requirement is deployed on the DU, and a function whose processing time does not need to satisfy the latency requirement is deployed on the CU.

In addition, the radio frequency apparatus may be not placed in the DU but is placed remotely from the DU, or may be integrated into the DU, or a part is placed remotely from the DU and a remaining part is integrated into the DU. This is not limited herein.

Figure 3:
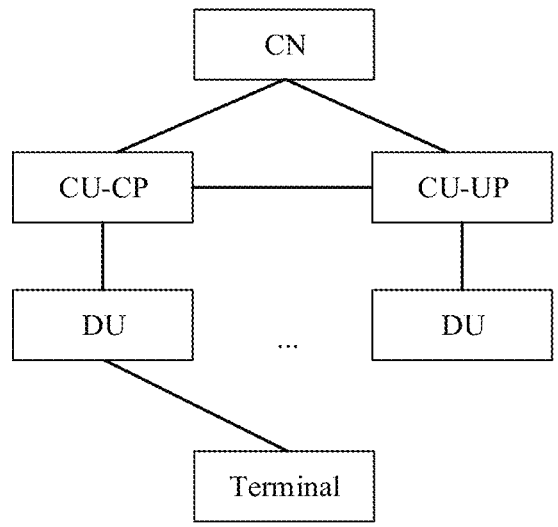
FIG. 3 is a schematic diagram of another specific communication architecture according to this application.

Refer to FIG. 3. Compared with the architecture shown in FIG. 2, a control plane (CP) and a user plane (UP) of the CU may alternatively be separated and implemented by using different entities, which are respectively a control plane CU entity (CU-CP entity) and a user plane CU entity (CU-UP entity).

In the foregoing network architecture, signaling generated by the CU may be sent to a terminal by using a DU, or signaling generated by the terminal may be sent to the CU by using the DU. The DU may transparently transmit the signaling to the terminal or the CU by directly encapsulating the signaling at a protocol layer without parsing the signaling. In the following embodiments, if transmission of such signaling between the DU and the terminal is included, sending or receiving of the signaling by the DU includes this scenario. For example, signaling at an RRC layer or a PDCP layer is finally processed as signaling at a PHY layer and sent to the terminal, or is converted from received signaling at a PHY layer. In this architecture, it may also be considered that the signaling at the RRC layer or the PDCP layer is sent by the DU, or sent by the DU and a radio frequency.

In the foregoing embodiment, the CU is classified as a network device on a RAN side. In addition, the CU may alternatively be classified as a network device on a CN side. This is not limited herein.

An apparatus in the following embodiments of this application may be located in a terminal or a network device based on functions implemented by the apparatus. When the foregoing CU-DU structure is used, a network device may be a CU node, a DU node, or a RAN device including a CU node and a DU node.

To facilitate understanding of the technical solutions in this application, technologies related to this application are first briefly described.

Figure 4:
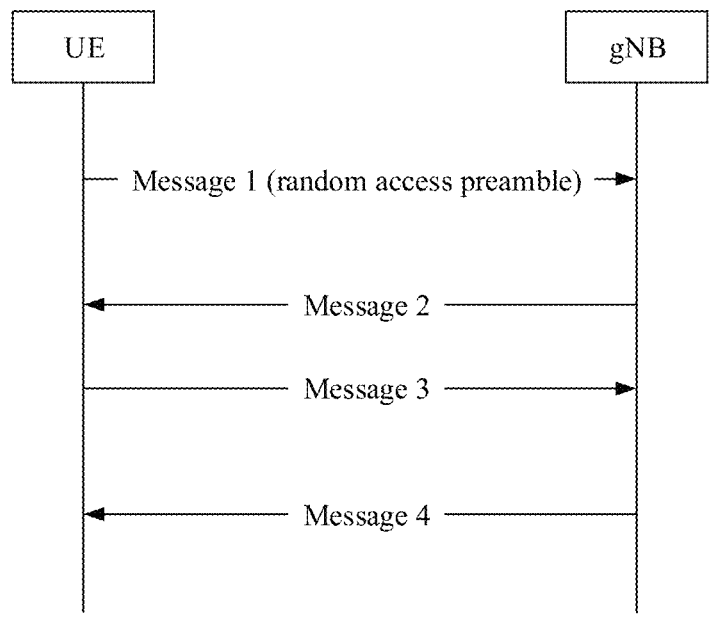
FIG. 4 is a schematic diagram of a signal transmission method in a conventional solution.

FIG. 4 is a schematic diagram of a random access process of a four-step random access type in a conventional solution. After selecting a proper cell and camping on the cell, a terminal may initiate random access. As shown in FIG. 4, UE sends a message 1 (denoted as msg 1 for short) to a network device. The message 1 is a random access preamble. After detecting the random access preamble, the network device returns a response message, namely, a message 2, to the UE. The message 2 includes an uplink resource allocated by the network device to the UE. After receiving the message 2, the UE sends a message 3 on the uplink resource indicated by the message 2. If the network device can correctly decode the message 3, the network device returns a message 4 to the UE, where the message 4 is used to notify the UE that contention succeeds. After the foregoing four steps, the random access process succeeds.

Figure 5:
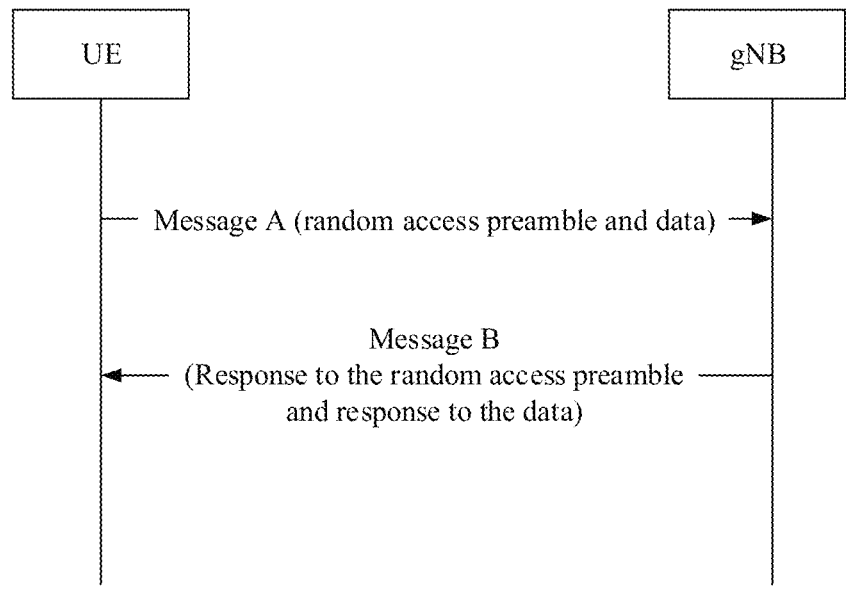
FIG. 5 is a schematic flowchart of a signal transmission method according to an embodiment of this application.

FIG. 5 is a schematic diagram of a random access process of a two-step random access type in a conventional solution.

In the two-step random access process, UE includes both a random access preamble and data (namely, a preamble and data) in a message A. The data part is used for contention resolution, and may be, for example, a radio resource control (RRC) message. If there is no conflict between UEs, a network device returns a message B to the UE after successfully decoding the message 1. The message B includes both a response to the random access preamble and a response to the data. The response to the random access preamble is a random access response (RAR). The response to the data is usually an RRC message. The two responses may be sent simultaneously, or may be sent successively. The UE may separately decode the two responses. After receiving the message 2, the UE learns that random access succeeds. If there is a conflict between the UEs, the network device may fail to obtain the data in the message A through decoding. In this case, the network device does not send the message 2 to the UE. After sending the message 1, the UE waits for a time window. If the UE does not receive the message 2, the random access fails.

In a conventional solution, when a terminal frequently moves, the terminal determines whether current TA is valid by determining whether a serving cell of the terminal changes. However, in NR, a requirement on a TA precision is increasingly high. How to more precisely determine whether current TA is valid, to reduce interference between uplink transmission, needs to be urgently resolved.

Figure 6:
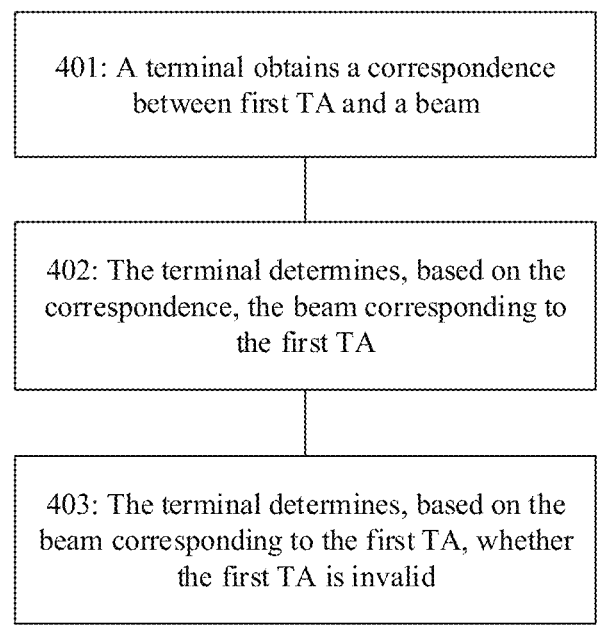
FIG. 6 is a schematic diagram of a signal transmission method according to a specific embodiment of this application.

FIG. 6 is a schematic flowchart of a method for processing TA of a terminal according to an embodiment of this application.

An execution body of this embodiment of this application may be a terminal or a network device, or may be a chip in the terminal or in the network device. For ease of description, the following embodiment is described by using the terminal or the network device as an example. However, this application is not limited thereto.

401: The terminal obtains a correspondence between first TA and a beam.

Specifically, in the correspondence, the first TA may correspond to a plurality of beams, or may correspond to one beam. This is not limited in this application.

It should be noted that when the first TA corresponds to a plurality of beams, the plurality of beams may be beams associated with a same TRP, or may be beams associated with different TRPs. This is not limited in this application.

It may be understood that the plurality of beams corresponding to the first TA may be downlink beams.

In an implementation, step 401 may be specifically that the terminal pre-stores the correspondence in a storage area, and reads the correspondence from the storage area when the correspondence is required.

In another implementation, step 401 may be specifically that the terminal obtains the correspondence from the network device.

Optionally, the terminal may directly receive the correspondence from the network device. Correspondingly, the network device sends the correspondence to the terminal.

Optionally, the terminal may receive indication information from the network device, where the indication information is used to indicate a beam list corresponding to the first TA, and the beam list includes an identifier of at least one beam. In other words, the terminal may indirectly obtain the correspondence between the first TA and the beam based on the indication information.

It may be understood that the indication information may include only the correspondence between the first TA and the beam, or may include a correspondence between each of a plurality of pieces of TA and a beam. The terminal may determine, in a manner of the first TA in this embodiment of this application, whether each of the plurality of pieces of TA fails. For ease of description, only the first TA is used as an example for description in this embodiment of this application. However, this application is not limited thereto.

Optionally, the identifier of the beam may be at least one of a beam index, a synchronization signal block (SSB) index, or a channel state information reference signal (CSI-RS) identifier.

Specifically, the beam may be identified by using the beam index, so that different beams can be identified. One SSB corresponds to one SSB index and is sent by using one beam, and different SSBs are sent by using different beams. Therefore, an SSB can be identified based on an SSB index, and a beam corresponding to each SSB can further be identified. One CSI-RS corresponds to one CSI-RS index and is sent by using one beam, and different CSI-RSs are sent by using different beams. Therefore, a CSI-RS can be identified based on a CSI-RS index, and a beam corresponding to each CSI-RS can further be identified.

402: The terminal determines, based on the correspondence, the beam corresponding to the first TA.

403: The terminal determines, based on the beam corresponding to the first TA, whether the first TA is invalid.

Specifically, the terminal obtains the correspondence between the first TA and the beam, determines, based on the correspondence, the beam corresponding to the first TA, and further determines, based on the beam corresponding to the first TA, whether the first TA is invalid. In other words, in this embodiment of this application, the terminal may determine, by using a finer granularity, whether the first TA is invalid, and this helps trigger selection of more appropriate TA. Therefore, compared with a conventional solution, this embodiment of this application can further reduce interference between uplink transmission.

It may be understood that step 403 may alternatively be that the terminal determines, based on the beam corresponding to the first TA, whether the first TA is valid.

In an embodiment, step 403 may be specifically that when the terminal moves out of coverage of the beam corresponding to the first TA, the terminal determines that the first TA is invalid.

Specifically, each beam has specific coverage, for example, may cover a specific geographical location area. If the terminal moves out of coverage of a beam, the first TA may be invalid. In other words, the terminal may determine, based on that the terminal moves out of the coverage of the beam corresponding to the first TA, that the first TA is invalid, so that interference between uplink transmission can be reduced.

Optionally, when determining that signal quality of the beam corresponding to the first TA is less than or equal to a preset threshold, the terminal may determine that the terminal moves out of the coverage of the beam corresponding to the first TA, where the first TA corresponds to at least one beam.

Specifically, the first TA may correspond to one or more beams. If signal quality of a signal transmitted by the terminal on the beam corresponding to the first TA is less than or equal to the preset threshold, the terminal may determine that the terminal moves out of the coverage of the beam corresponding to the first TA. In this way, the terminal may determine, based on a relationship between the signal quality of the beam corresponding to the first TA and the preset threshold, whether the terminal moves out of the coverage of the beam corresponding to the first TA, and determine, when the terminal moves out of the coverage of the beam corresponding to the first TA, that the first TA is invalid. This helps trigger the terminal to select more appropriate TA, and further reduces interference between uplink transmission.

When the first TA corresponds to a plurality of beams, when the terminal determines that signal quality of a signal transmitted on each of the plurality of beams is less than or equal to the preset threshold, or that signal quality of a signal transmitted on one part of the plurality of beams is less than the preset threshold and signal quality of a signal transmitted on the other part of the plurality of beams is equal to the preset threshold, the terminal may consider that the terminal moves out of the coverage of the beam corresponding to the first TA. Alternatively, when the terminal determines that highest signal quality in signal quality of the plurality of beams is less than or equal to the preset threshold, the terminal may consider that the terminal moves out of the coverage of the beam corresponding to the first TA. Alternatively, when the terminal determines that an average value of signal quality of a part or all of the plurality of beams is less than or equal to the preset threshold, the terminal may consider that the terminal moves out of the coverage of the beam corresponding to the first TA.

For example, the first TA corresponds to p beams. The terminal may calculate an average value of signal quality of q beams in the p beams, and determine a value relationship between the average value and the preset threshold, to determine whether the terminal moves out of the coverage of the beam corresponding to the first TA. q<p, and both p and q are positive integers.

It may be understood that the q beams may be beams with highest signal quality in the p beams, or the q beams are beams whose signal quality is greater than a preset condition. This is not limited in this application.

It may be understood that the signal quality in this application may be represented by using a reference signal received power (RSRP), reference signal received quality (RSRQ), or a physical downlink control channel (PDCCH) block error rate (BLER). This is not limited in this application.

It may be understood that the preset threshold may be configured by the network device, or may be pre-agreed on by the terminal and the network device. This is not limited in this application.

Optionally, when a quantity of beams whose signal quality is greater than or equal to the preset threshold in the plurality of beams corresponding to the first TA is less than or equal to N, the terminal determines that the terminal moves out of the coverage of the beam corresponding to the first TA, where N is a positive integer. Alternatively, when a quantity of beams whose signal quality is greater than or equal to the preset threshold in the plurality of beams corresponding to the first TA is greater than L, the terminal determines that the terminal moves out of the coverage of the beam corresponding to the first TA, where L is a positive integer.

Specifically, if a quantity of beams that are in the plurality of beams corresponding to the first TA and on which signal quality of a signal transmitted by the terminal is greater than or equal to the preset threshold is less than or equal to N, the terminal determines that the terminal moves out of the coverage of the beam corresponding to the first TA. Alternatively, if a quantity of beams that are in the plurality of beams corresponding to the first TA and on which signal quality of a signal transmitted by the terminal is less than the preset threshold is greater than L, the terminal determines that the terminal moves out of the coverage of the beam corresponding to the first TA. L and N are both positive integers, and may be the same or may be different. In this way, the terminal may determine, based on the quantity of beams whose signal quality is greater than the preset threshold in the beams corresponding to the first TA, whether the terminal moves out of the coverage of the beam corresponding to the first TA, and determine, when the terminal moves out of the coverage of the beam corresponding to the first TA, that the first TA is invalid. This helps trigger the terminal to select more appropriate TA, and further reduces interference between uplink transmission.

For example, the first TA corresponds to six beams. If a quantity of beams whose signal quality is greater than the preset threshold is 2, it is considered that the terminal moves out of the coverage of the beam corresponding to the first TA. Alternatively, if a quantity of beams whose signal quality is less than the preset threshold is 4, it is considered that the terminal moves out of the coverage of the beam corresponding to the first TA.

For another example, the first TA corresponds to six beams. If a quantity of beams whose signal quality is greater than the preset threshold is 3, it is considered that the terminal moves out of the coverage of the beam corresponding to the first TA. Alternatively, if a quantity of beams whose signal quality is less than the preset threshold is 3, it is considered that the terminal moves out of the coverage of the beam corresponding to the first TA.

It may be understood that the preset threshold, a value of L, and a value of N may be separately configured by the network device, or may be pre-agreed on by the terminal and the network device. This is not limited in this application.

Optionally, when an average value of first S pieces of signal quality sorted in descending order of signal quality in the plurality of beams corresponding to the first TA is less than or equal to the preset threshold, the terminal may determine that the terminal moves out of the coverage of the beam corresponding to the first TA.

Specifically, if the average value of the S pieces of signal quality that are higher in signal quality of the plurality of beams corresponding to the first TA is less than or equal to the preset threshold, it is determined that the terminal moves out of the coverage of the beam corresponding to the first TA. In other words, the S pieces of high signal quality are selected from the signal quality of the plurality of beams. For example, the signal quality of the plurality of beams may be sorted in descending order: an RSRP 1, an RSRP 3, an RSRP 4, and an RSRP 2, where the RSRP 1>the RSRP 3>the RSRP 4>the RSRP 2. S=2, that is, first two pieces of signal quality are selected, namely, the RSRP 1 and the RSRP 3. Alternatively, the signal quality of the plurality of beams is sorted in ascending order, and last S pieces of signal quality are selected.

It may be understood that signal quality of different beams in the plurality of beams may be the same or may be different. Therefore, the first S pieces of signal quality may be signal quality of S beams, or may be signal quality of more than S beams.

It may be understood that the preset threshold and a value of S may be separately configured by the network device, or may be pre-agreed on by the terminal and the network device. This is not limited in this application.

In another embodiment, step 403 may be specifically that when a variation of signal quality of a plurality of beams corresponding to the first TA is greater than a first preset threshold, the terminal determines that the first TA is invalid.

Specifically, if the variation of the signal quality of the plurality of beams corresponding to the first TA is greater than the first preset threshold, the terminal moves relatively fast, and a location is updated relatively fast. As a result, the first TA may be inaccurate (that is, the first TA is invalid). Therefore, if the terminal detects that the variation of the signal quality is greater than the preset threshold, it may be considered that the first TA is invalid. This further helps trigger the terminal to select more appropriate TA, and further reduces interference between uplink transmission.

It may be understood that the variation may be a variation over time.

It may further be understood that the first preset threshold may be configured by the network device, or may be pre-agreed on by the terminal and the network device. This is not limited in this application.

Optionally, the variation of the signal quality of the plurality of beams corresponding to the first TA may be specifically a variation of a difference between signal quality of a first beam in the plurality of beams corresponding to the first TA and signal quality of a second beam.

Specifically, the first TA corresponds to a plurality of beams, and the variation of the signal quality of the plurality of beams may be specifically a variation of a difference between signal quality of any two beams in the plurality of beams. In other words, when the variation between the signal quality of the any two beams is greater than the first preset threshold, the terminal may consider that the variation of the signal quality of the plurality of beams corresponding to the first TA is greater than the first preset threshold, and further consider that the first TA is invalid. This helps trigger the terminal to select more appropriate TA, and further reduces interference between uplink transmission.

It may further be understood that the first beam or the second beam may be a preset reference beam, may be selected by the terminal, or may be indicated by the network device. This is not limited in this application.

Optionally, the variation of the signal quality of the plurality of beams corresponding to the first TA may be specifically a variation of signal quality of at least one of the plurality of beams corresponding to the first TA.

Specifically, when a variation of signal quality of a part of the plurality of beams is greater than the first preset threshold, the terminal may consider that the variation of the signal quality of the plurality of beams corresponding to the first TA is greater than the first preset threshold, and further consider that the first TA is invalid. For example, when a variation of signal quality of any one of the plurality of beams is greater than the first preset threshold, the terminal may consider that the variation of the signal quality of the plurality of beams corresponding to the first TA is greater than the first preset threshold, and further consider that the first TA is invalid. This helps trigger the terminal to select more appropriate TA, and further reduces interference between uplink transmission.

In still another embodiment, step 403 may be specifically that when determining that there is another beam whose signal quality is greater than the signal quality of the beam corresponding to the first TA, the terminal determines that the first TA is invalid.

Specifically, if there is another beam whose signal quality is greater than a largest value in signal quality of all or a part of the plurality of beams corresponding to the first TA, it is considered that there is another beam whose signal quality is greater than the signal quality of the beam corresponding to the first TA. Alternatively, if there is another beam whose signal quality is greater than an average value of signal quality of all or a part of the plurality of beams corresponding to the first TA, it is considered that there is another beam whose signal quality is greater than the signal quality of the beam corresponding to the first TA. In this case, the terminal may consider that the first TA is invalid. This further helps trigger the terminal to select more appropriate TA, and further reduces interference between uplink transmission.

In still another embodiment, step 403 may be specifically that when determining that there is another beam whose signal quality is greater than or equal to a second preset threshold, the terminal determines that the first TA is invalid.

Specifically, if there is another beam whose signal quality is greater than or equal to the second preset threshold, it is considered that the first TA is invalid. The second preset threshold is usually set to be greater than an average value of the signal quality of the plurality of beams corresponding to the first TA. This helps trigger the terminal to select more appropriate TA, and further reduces interference between uplink transmission.

It may be understood that the second preset threshold may be configured by the network device, or may be pre-agreed on by the terminal and the network device. This is not limited in this application.

After step 403, if the terminal determines that the first TA is invalid, the terminal may initiate random access to request new first TA. Specifically, a random access process may be shown in FIG. 4 or FIG. 5.

Optionally, when the first TA is invalid, the terminal may further release a configured grant resource of the beam corresponding to the first TA. In this way, a resource waste can be avoided, and resource utilization can be improved.

Specifically, the configured grant resource may include a frequency domain resource and a modulation and coding scheme.

It may be understood that the configured grant resource may be configured by the network device by using RRC signaling, or may be activated by using downlink control information (DCI).

It may be understood that the terminal may stop timing of a first TA timer corresponding to the first TA.

It may further be understood that, in the foregoing random access process, the terminal may send a small amount of data to the network device.

Optionally, that the terminal initiates the random access process may be specifically that the terminal sends a random access request; receives a response message that is sent by the network device to respond to the random access request, where the response message includes second TA; and performs uplink transmission by using the second TA. In this way, the terminal can perform uplink transmission by using new TA, so that interference between uplink transmission is reduced.

Specifically, the random access request may be the message 1 or the message 3 shown in FIG. 4, or may be in the message A shown in FIG. 4. The second TA may be carried in the message 4 in the random access manner shown in FIG. 4, or carried in the message B in the random access manner shown in FIG. 5.

Optionally, the response message for the random access request may alternatively be used to indicate a beam corresponding to the second TA.

Specifically, when configuring new TA (for example, the second TA) for the terminal, the network device may further configure the beam corresponding to the second TA. Specifically, the network device may directly indicate, by using the response message, the beam corresponding to the second TA, or indirectly indicate the beam corresponding to the second TA. For example, the response message includes indication information, and the indication information directly indicates the beam corresponding to the second TA. Alternatively, the terminal uses a beam on which the response message is located as the beam corresponding to the second TA. In other words, when configuring the second TA for the terminal, the network device also adds, to the beam list, the beam corresponding to the second TA. In this way, the terminal can subsequently determine, based on the beam list, the beam corresponding to the second TA, to determine whether the second TA is invalid, and interference between subsequent uplink transmission is reduced.

Optionally, the network device may alternatively send a broadcast message to the terminal before sending the indication information. The broadcast message includes a plurality of beam lists, and each of the plurality of beam lists includes at least one beam identifier. Correspondingly, the terminal receives the broadcast message from the network device.

Specifically, the indication information may be one of the plurality of beam lists. In other words, the network device may identify the beam list in advance by using the broadcast message, and then directly indicate the beam identifier by using the indication information, so that the terminal can learn of the beam corresponding to the second TA.

Optionally, in the foregoing random access process, the terminal may send reason information to the network device, where the reason information is used to indicate a reason for initiating the random access.

Specifically, the reason information may be carried in a random access request. In this way, the network device may configure new TA for the terminal based on the reason information, so that the terminal can obtain more appropriate TA, and interference between uplink transmission is further reduced.

Optionally, the reason includes that the TA is invalid, or that the configured grant resource (grant free) is cleared.

It may be understood that the clearing of the configured grant resource may be caused because the TA is invalid.

Figure 7:
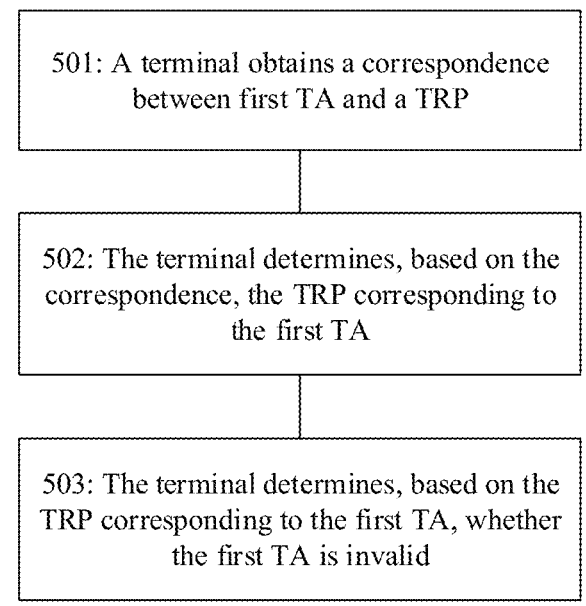
FIG. 7 is a schematic diagram of a signal transmission method according to another specific embodiment of this application.

FIG. 7 is a schematic flowchart of a method for processing TA of a terminal according to another embodiment of this application.

It may be understood that, unless otherwise specified, same terms in the embodiment shown in FIG. 7 and the embodiment shown in FIG. 6 represent a same meaning. To avoid repetition, details are not described herein again.

501: The terminal obtains a correspondence between TA and a TRP.

Specifically, in the correspondence, the first TA may correspond to a plurality of TRPs, or may correspond to one TRP. This is not limited in this application.

In an implementation, step 501 may be specifically that the terminal pre-stores the correspondence in a storage area, and reads the correspondence from the storage area when the correspondence is required.

In another implementation, step 501 may be specifically that the terminal obtains the correspondence from a network device.

Optionally, the terminal may directly receive the correspondence from the network device. Correspondingly, the network device sends the correspondence to the terminal.

Optionally, the terminal may receive indication information from the network device, where the indication information is used to indicate a beam list corresponding to the first TA, and the beam list includes an identifier of at least one beam. The beam list has an association relationship with the TRP. In other words, the terminal may indirectly obtain the correspondence between the first TA and the TRP based on the indication information. For example, the terminal determines, based on a beam identifier in the beam list, the TRP associated with at least one beam identifier included in the beam list. Alternatively, the terminal determines the associated TRP based on an identifier of the beam list.

It may be understood that the indication information may include only the correspondence between the first TA and the TRP, or may include a correspondence between each of a plurality of pieces of TA and a TRP. The terminal may determine, in a manner of the first TA in this embodiment of this application, whether each of the plurality of pieces of TA fails. For ease of description, only the first TA is used as an example for description in this embodiment of this application. However, this application is not limited thereto.

502: The terminal determines, based on the correspondence, the TRP corresponding to the first TA.

503: The terminal determines, based on the TRP corresponding to the first TA, whether the first TA is invalid.

Specifically, the terminal obtains the correspondence between the first TA and the TRP, and determines, based on the correspondence, the TRP corresponding to the first TA. In this way, the terminal may determine, based on the TRP corresponding to the first TA, whether the first TA is invalid. In other words, in this embodiment of this application, the terminal may determine, by using a finer granularity, whether the first TA is invalid, and this helps trigger selection of more appropriate TA. Therefore, compared with a conventional solution, this embodiment of this application can further reduce interference between uplink transmission.

It may be understood that step 503 may alternatively be that the terminal determines, based on the TRP corresponding to the first TA, whether the first TA is valid.

Optionally, step 503 may be specifically that the terminal determines, based on a beam associated with the TRP corresponding to the first TA, whether the first TA is invalid.

In an embodiment, step 503 may be specifically that when the terminal moves out of coverage of the TRP corresponding to the first TA, the terminal determines that the first TA is invalid.

Specifically, each TRP may have specific coverage, for example, may cover a specific geographical location area. If the terminal moves out of coverage of a TRP, the first TA may be invalid. In other words, the terminal may determine, based on that the terminal moves out of the coverage of the TRP corresponding to the first TA, that the first TA is invalid, so that interference between uplink transmission can be reduced.

Optionally, when determining that signal quality of a beam associated with the TRP corresponding to the first TA is less than or equal to a preset threshold, the terminal may determine that the terminal moves out of the coverage of the TRP corresponding to the first TA, where the TRP is associated with at least one beam.

Specifically, the TRP may be associated with one or more beams. If signal quality of a signal transmitted by the terminal on the beam associated with the TRP corresponding to the first TA is less than or equal to the preset threshold, the terminal may determine that the terminal moves out of the coverage of the TRP corresponding to the first TA. In this way, the terminal may determine, based on a relationship between the signal quality of the beam associated with the TRP corresponding to the first TA and the preset threshold, whether the terminal moves out of the coverage of the TRP corresponding to the first TA, and determine, when the terminal moves out of the coverage of the TRP corresponding to the first TA, that the first TA is invalid. This helps trigger the terminal to select more appropriate TA, and further reduces interference between uplink transmission.

When the TRP is associated with a plurality of beams, when the terminal determines that signal quality of a signal transmitted on each of the plurality of beams is less than or equal to the preset threshold, or that signal quality of a signal transmitted on one part of the plurality of beams is less than the preset threshold and signal quality of a signal transmitted on the other part of the plurality of beams is equal to the preset threshold, the terminal may consider that the terminal moves out of the coverage of the TRP corresponding to the first TA. Alternatively, when the terminal determines that highest signal quality in signal quality of the plurality of beams is less than or equal to the preset threshold, the terminal may consider that the terminal moves out of the coverage of the TRP corresponding to the first TA. Alternatively, when the terminal determines that an average value of the signal quality of the plurality of beams is less than or equal to the preset threshold, the terminal may consider that the terminal moves out of the coverage of the TRP corresponding to the first TA.

It may be understood that the preset threshold may be configured by the network device, or may be pre-agreed on by the terminal and the network device. This is not limited in this application.

It may be understood that the signal quality in this application may be represented by using a reference signal received power (RSRP), reference signal received quality (RSRQ), or a physical downlink control channel (PDCCH) block error rate (BLER). This is not limited in this application.

Optionally, when a quantity of beams whose signal quality is greater than or equal to the preset threshold in the plurality of beams associated with the TRP corresponding to the first TA is less than or equal to N, the terminal determines that the terminal moves out of the coverage of the TRP corresponding to the first TA, where N is a positive integer. Alternatively, when a quantity of beams whose signal quality is greater than or equal to the preset threshold in the plurality of beams associated with the TRP corresponding to the first TA is greater than L, the terminal determines that the terminal moves out of the coverage of the TRP corresponding to the first TA, where L is a positive integer.

Specifically, if a quantity of beams that are in the plurality of beams associated with the TRP corresponding to the first TA and on which signal quality of a signal transmitted by the terminal is greater than or equal to the preset threshold is less than or equal to N, the terminal determines that the terminal moves out of the coverage of the TRP corresponding to the first TA. Alternatively, if a quantity of beams that are in the plurality of beams associated with the TRP corresponding to the first TA and on which signal quality of a signal transmitted by the terminal is less than the preset threshold is greater than L, the terminal determines that the terminal moves out of the coverage of the TRP corresponding to the first TA. L and N are both positive integers, and may be the same or may be different. In this way, the terminal may determine, based on the quantity of beams whose signal quality is greater than the preset threshold in the beams associated with the TRP corresponding to the first TA, whether the terminal moves out of the coverage of the TRP corresponding to the first TA, and determine, when the terminal moves out of the coverage of the TRP corresponding to the first TA, that the first TA is invalid. This helps trigger the terminal to select more appropriate TA, and further reduces interference between uplink transmission.

For example, the TRP corresponding to the first TA is associated with six beams. If a quantity of beams whose signal quality is greater than the preset threshold is 2, it is considered that the terminal moves out of the coverage of the TRP corresponding to the first TA. Alternatively, if a quantity of beams whose signal quality is less than the preset threshold is 4, it is considered that the terminal moves out of the coverage of the TRP corresponding to the first TA.

For another example, the TRP corresponding to the first TA is associated with six beams. If a quantity of beams whose signal quality is greater than the preset threshold is 3, it is considered that the terminal moves out of the coverage of the TRP corresponding to the first TA. Alternatively, if a quantity of beams whose signal quality is less than the preset threshold is 3, it is considered that the terminal moves out of the coverage of the TRP corresponding to the first TA.

It may be understood that the preset threshold, a value of L, and a value of N may be separately configured by the network device, or may be pre-agreed on by the terminal and the network device. This is not limited in this application.

Optionally, when an average value of first S pieces of signal quality sorted in descending order of signal quality in the plurality of beams associated with the TRP corresponding to the first TA is less than or equal to the preset threshold, the terminal may determine that the terminal moves out of the coverage of the TRP corresponding to the first TA.

Specifically, if the average value of the S pieces of signal quality that are higher in signal quality of the plurality of beams associated with the TRP corresponding to the first TA is less than or equal to the preset threshold, it is determined that the terminal moves out of the coverage of the TRP corresponding to the first TA. In other words, the S pieces of high signal quality are selected from the signal quality of the plurality of beams. For example, the signal quality of the plurality of beams may be sorted in descending order, and first S pieces of signal quality are selected. Alternatively, the signal quality of the plurality of beams is sorted in ascending order, and last S pieces of signal quality are selected.

It may be understood that signal quality of different beams in the plurality of beams may be the same or may be different. Therefore, the first S pieces of signal quality may be signal quality of S beams, or may be signal quality of more than S beams.

It may be understood that the preset threshold and a value of S may be separately configured by the network device, or may be pre-agreed on by the terminal and the network device. This is not limited in this application.

In another embodiment, step 503 may be specifically that when a variation of signal quality of a plurality of beams associated with the TRP corresponding to the first TA is greater than a first preset threshold, the terminal determines that the first TA is invalid.

Specifically, if the variation of the signal quality of the plurality of beams associated with the TRP corresponding to the first TA is greater than the first preset threshold, the terminal moves relatively fast, and a location is updated relatively fast. As a result, the first TA may be inaccurate (that is, the first TA is invalid). Therefore, if the terminal detects that the variation of the signal quality is greater than the preset threshold, it may be considered that the first TA is invalid. This further helps trigger the terminal to select more appropriate TA, and further reduces interference between uplink transmission.

It may be understood that the variation may be a variation over time.

It may further be understood that the first preset threshold may be configured by the network device, or may be pre-agreed on by the terminal and the network device. This is not limited in this application.

Optionally, the variation of the signal quality of the plurality of beams associated with the TRP corresponding to the first TA may be specifically a variation of a difference between signal quality of a first beam associated with the TRP in the plurality of beams associated with the TRP corresponding to the first TA and signal quality of a second beam associated with the TRP.

Specifically, the TRP corresponding to the first TA is associated with the plurality of beams, and the variation of the signal quality of the plurality of beams associated with the TRP may be specifically a variation of a difference between signal quality of any two beams in the plurality of beams associated with the TRP. In other words, when the variation between the signal quality of the any two beams associated with the TRP is greater than the first preset threshold, the terminal may consider that the variation of the signal quality of the plurality of beams associated with the TRP corresponding to the first TA is greater than the first preset threshold, and further consider that the first TA is invalid. This helps trigger the terminal to select more appropriate TA, and further reduces interference between uplink transmission.

Optionally, the variation of the signal quality of the plurality of beams associated with the TRP corresponding to the first TA may be specifically a variation of signal quality of at least one of the plurality of beams associated with the TRP corresponding to the first TA.

Specifically, when a variation of signal quality of a part of the plurality of beams is greater than the first preset threshold, the terminal may consider that the variation of the signal quality of the plurality of beams associated with the TRP corresponding to the first TA is greater than the first preset threshold, and further consider that the first TA is invalid. For example, when a variation of signal quality of any beam associated with the TRP in the plurality of beams is greater than the first preset threshold, the terminal may consider that the variation of the signal quality of the plurality of beams associated with the TRP corresponding to the first TA is greater than the first preset threshold, and further consider that the first TA is invalid. This helps trigger the terminal to select more appropriate TA, and further reduces interference between uplink transmission.

In still another embodiment, step 503 may be specifically that when determining that there is another beam, associated with the TRP, whose signal quality is greater than the signal quality of the beam associated with the TRP corresponding to the first TA, the terminal determines that the first TA is invalid.

Specifically, if there is another beam, associated with the TRP, whose signal quality is greater than a largest value in signal quality of all or a part of the plurality of beams associated with the TRP corresponding to the first TA, it is considered that there is another beam, associated with the TRP, whose signal quality is greater than the signal quality of the beam associated with the TRP corresponding to the first TA. Alternatively, if there is another beam, associated with the TRP, whose signal quality is greater than an average value of signal quality of all or a part of the plurality of beams associated with the TRP corresponding to the first TA, it is considered that there is another beam, associated with the TRP, whose signal quality is greater than the signal quality of the beam associated with the TRP corresponding to the first TA. In this case, the terminal may consider that the first TA is invalid. This further helps trigger the terminal to select more appropriate TA, and further reduces interference between uplink transmission.

In still another embodiment, step 503 may be specifically that when determining that there is another beam, associated with the TRP, whose signal quality is greater than or equal to a second preset threshold, the terminal determines that the first TA is invalid.

Specifically, if there is another beam, associated with the TRP, whose signal quality is greater than or equal to the second preset threshold, it is considered that the first TA is invalid. The second preset threshold is usually set to be greater than an average value of the signal quality of the plurality of beams associated with the TRP corresponding to the first TA. This helps trigger the terminal to select more appropriate TA, and further reduces interference between uplink transmission.

It may be understood that the second preset threshold may be configured by the network device, or may be pre-agreed on by the terminal and the network device. This is not limited in this application.

After step 503, if the terminal determines that the first TA is invalid, the terminal may initiate random access to request new first TA. Specifically, a random access process may be shown in FIG. 4 or FIG. 5.

Optionally, when the first TA is invalid, the terminal may further release a configured grant resource of the beam associated with the TRP corresponding to the first TA. In this way, a resource waste can be avoided, and resource utilization can be improved.

Specifically, the configured grant resource may include a time-frequency resource and a modulation and coding scheme.

It may be understood that the configured grant resource may be configured by the network device by using RRC signaling, or may be activated by using downlink control information (DCI).

It may be understood that the terminal may stop timing of a first TA timer corresponding to the first TA.

It may further be understood that, in the foregoing random access process, the terminal may send a small amount of data to the network device.

Optionally, that the terminal initiates the random access process may be specifically that the terminal sends a random access request; receives a response message that is sent by the network device to respond to the random access request, where the response message includes second TA; and performs uplink transmission by using the second TA. In this way, the terminal can perform uplink transmission by using new TA, so that interference between uplink transmission is reduced.

Specifically, the random access request may be the message 1 or the message 3 shown in FIG. 4, or may be the message A shown in FIG. 4. The second TA may be carried in the message 4 in the random access manner shown in FIG. 4, or carried in the message B in the random access manner shown in FIG. 5.

Optionally, the response message for the random access request may alternatively be used to indicate a beam associated with a TRP corresponding to the second TA.

Specifically, when configuring new TA (for example, the second TA) for the terminal, the network device may further configure the beam associated with the TRP corresponding to the second TA. Specifically, the network device may directly indicate, by using the response message, the beam associated with the TRP corresponding to the second TA, or indirectly indicate the beam associated with the TRP corresponding to the second TA. For example, the response message includes indication information, and the indication information directly indicates the beam associated with the TRP corresponding to the second TA. Alternatively, the terminal uses a beam, associated with the TRP, on which the response message is located as the beam associated with the TRP corresponding to the second TA. In other words, when configuring the second TA for the terminal, the network device also adds, to the beam list associated with the TRP, the beam associated with the TRP corresponding to the second TA. In this way, the terminal can subsequently determine, based on the beam list associated with the TRP, the beam associated with the TRP corresponding to the second TA, to determine whether the second TA is invalid, so that interference between subsequent uplink transmission is reduced.

Optionally, the network device may alternatively send a broadcast message to the terminal before sending the indication information. The broadcast message includes a plurality of beam lists associated with the TRP, and each of the plurality of beam lists associated with the TRP includes at least one beam identifier associated with the TRP. Correspondingly, the terminal receives the broadcast message from the network device.

Specifically, the indication information may be one of the plurality of beam lists associated with the TRP. In other words, the network device may identify, in advance by using the broadcast message, the beam list associated with the TRP, and then directly indicate, by using the indication information, the beam identifier associated with the TRP, so that the terminal can learn of the beam associated with the TRP corresponding to the second TA.

It may be understood that the beam indicated by the beam identifier included in the beam list may be a beam corresponding to the TRP.

Optionally, in the foregoing random access process, the terminal may send reason information to the network device, where the reason information is used to indicate a reason for initiating the random access.

Specifically, the reason information may be carried in a random access request. In this way, the network device may configure new TA for the terminal based on the reason information, so that the terminal can obtain more appropriate TA, and interference between uplink transmission is further reduced.

Optionally, the reason includes that the TA is invalid, or that the configured grant resource (grant free) is cleared.

It may be understood that the clearing of the configured grant resource may be caused because the TA is invalid.

Embodiments described in this specification may be independent solutions, or may be combined based on internal logic. These solutions all fall within the protection scope of this application.

It may be understood that, in the foregoing method embodiments, the methods and the operations implemented by the terminal may alternatively be implemented by a component (for example, a chip or a circuit) used in the terminal, and the methods and the operations implemented by the network device may alternatively be implemented by a component (for example, a chip or a circuit) used in the network device.

The foregoing mainly describes the solutions provided in embodiments of this application from a perspective of interaction. It may be understood that to implement the foregoing functions, the network elements, such as the terminal or the network device, include a corresponding hardware structure and/or software module for performing each function. A person skilled in the art may be aware that, in combination with units and algorithm steps of the examples described in embodiments disclosed in this specification, this application may be implemented by hardware or a combination of hardware and computer software. Whether a function is executed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional modules of the terminal or the network device may be obtained through division based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that the division of modules in embodiments of this application is an example, and is merely logical function division, and another division manner may be used in actual implementation. An example in which each functional module is obtained through division based on a corresponding function is used below for description.

It should be understood that specific examples in embodiments of this application are merely intended to help a person skilled in the art better understand embodiments of this application, but are not intended to limit the scope of embodiments of this application.

It should be understood that sequence numbers of the foregoing processes do not mean an execution sequence in various embodiments of this application. The execution sequence of the processes should be determined according to functions and internal logic of the processes, and should not be construed as any limitation on the implementation processes of embodiments of this application.

The methods provided in embodiments of this application are described above in detail with reference to FIG. 6 and FIG. 7. Apparatuses provided in embodiments of this application are described below in detail with reference to FIG. 8 to FIG. 15. It should be understood that descriptions of the apparatus embodiments correspond to the descriptions of the method embodiments. Therefore, for content that is not described in detail, refer to the foregoing method embodiments. For brevity, details are not described herein again.

Figure 8:
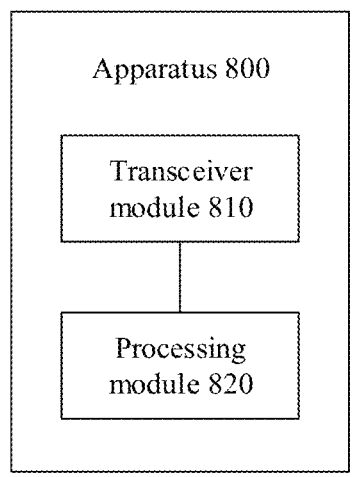
FIG. 8 is a schematic block diagram of a signal transmission apparatus according to an embodiment of this application.

FIG. 8 is a schematic block diagram of an apparatus 800 for processing timing advance TA of a terminal according to an embodiment of this application.

It should be understood that the apparatus 800 may correspond to each terminal shown in FIG. 1 or a chip in the terminal, and the terminal in the embodiment shown in FIG. 6 or a chip in the terminal, and may have any function of the terminal in the method embodiment shown in FIG. 6. The apparatus 800 includes a transceiver module 810 and a processing module 820.

The transceiver module 810 is configured to obtain a correspondence between first TA and a beam or a transmission reception point TRP;

the processing module 820 is configured to determine, based on the correspondence, the beam or the TRP corresponding to the first TA; and the processing module 820 is further configured to determine, based on signal quality of the beam or the TRP, whether the first TA is invalid.

Optionally, the processing module 820 is specifically configured to: when the terminal moves out of coverage of the beam or the TRP corresponding to the first TA, determine that the first TA is invalid.

Optionally, the processing module 820 is further configured to: when the signal quality of the beam corresponding to the first TA is less than or equal to a preset threshold, determine that the terminal moves out of the coverage of the beam corresponding to the first TA, where the first TA corresponds to at least one beam; when a quantity of beams whose signal quality is greater than or equal to the preset threshold in a plurality of beams corresponding to the first TA is less than or equal to N, determine that the terminal moves out of the coverage of the beam corresponding to the first TA, where N is a positive integer; when a quantity of beams whose signal quality is less than or equal to the preset threshold in the plurality of beams corresponding to the first TA is greater than L, determine that the terminal moves out of the coverage of the beam corresponding to the first TA, where L is a positive integer; or when an average value of first S pieces of signal quality sorted in descending order of signal quality in the plurality of beams corresponding to the first TA is less than or equal to the preset threshold, determine that the terminal moves out of the coverage of the beam corresponding to the first TA, where S is a positive integer.

Optionally, the processing module 820 is further configured to: when signal quality of a beam associated with the TRP corresponding to the first TA is less than or equal to a preset threshold, determine that the terminal moves out of the coverage of the TRP corresponding to the first TA, where the beam associated with the TRP is at least one beam; when a quantity of beams whose signal quality is greater than or equal to the preset threshold in a plurality of beams associated with the TRP corresponding to the first TA is less than or equal to N, determine that the terminal moves out of the coverage of the TRP corresponding to the first TA, where N is an integer; when a quantity of beams whose signal quality is less than or equal to the preset threshold in the plurality of beams associated with the TRP corresponding to the first TA is greater than or equal to L, determine that the terminal moves out of the coverage of the TRP corresponding to the first TA, where L is a positive integer; or when an average value of first S pieces of signal quality sorted in descending order of signal quality in the plurality of beams associated with the TRP corresponding to the first TA is less than or equal to the preset threshold, determine that the terminal moves out of the coverage of the TRP corresponding to the first TA, where S is a positive integer.

Optionally, the processing module 820 is specifically configured to: when a variation of signal quality of a plurality of beams corresponding to the first TA or a plurality of beams associated with the TRP corresponding to the first TA is greater than a first preset threshold, determine that the first TA is invalid; when there is another beam whose signal quality is greater than the signal quality of the beam corresponding to the first TA or the beam associated with the TRP corresponding to the first TA, determine that the first TA is invalid; or when there is another beam whose signal quality is greater than or equal to a second preset threshold, determine that the first TA is invalid.

Optionally, the processing module 820 is further configured to: when a variation of a difference between signal quality of a first beam in the plurality of beams corresponding to the first TA or the plurality of beams associated with the TRP corresponding to the first TA and signal quality of a second beam is greater than or equal to the first preset threshold, determine that a variation of the signal quality of the beam corresponding to the first TA is greater than the first preset threshold; or when a variation of the signal quality of the first beam in the plurality of beams corresponding to the first TA or the plurality of beams associated with the TRP corresponding to the first TA is greater than or equal to the first preset threshold, determine that the variation of the signal quality of the beam corresponding to the first TA is greater than the first preset threshold.

Optionally, the transceiver module 810 is specifically configured to:
obtain the correspondence from a network device.

Optionally, the transceiver module 810 is specifically configured to:
receive indication information from the network device, where the indication information is used to indicate a beam list corresponding to the first TA, the beam list includes an identifier of at least one beam, or is used to indicate the TRP corresponding to the first TA, and the TRP is associated with at least one beam.

Optionally, the identifier of the beam includes a beam index, a synchronization signal block SSB index, or a channel state information reference signal CSI-RS identifier.

Optionally, the transceiver module 810 is further configured to initiate random access when the first TA is invalid, and send reason information to the network device in a random access process, where the reason information is used to indicate a reason for initiating the random access.

Optionally, the reason includes that the TA is invalid, or that a configured grant resource is cleared.

Optionally, the transceiver module 810 is specifically configured to:
send a random access request; and
receive a response message for the random access request, where the response message includes second TA and indication information, and the indication information indicates a beam or a TRP corresponding to the second TA, or a TRP or a beam on which the response message is located is a beam or a TRP corresponding to the second TA.

The processing module 820 is further configured to perform uplink transmission by using the second TA.

Optionally, the transceiver module 810 is further configured to receive a broadcast message, where the broadcast message includes a plurality of beam lists or information about a plurality of TRPs, and the indication information is used to indicate one of the plurality of beam lists or one of the plurality of TRPs.

Optionally, the processing module 820 is further configured to: when the first TA is invalid, release the configured grant resource corresponding to the first TA.

For more detailed descriptions of the transceiver module 810 and the processing module 820, refer to related descriptions in the foregoing method embodiments. Details are not described herein again.

Figure 9:
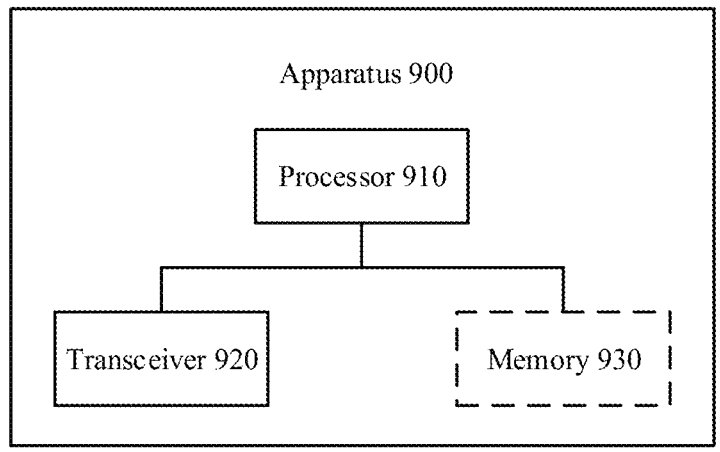
FIG. 9 is a schematic diagram of a structure of a signal transmission apparatus according to an embodiment of this application.

FIG. 9 shows an apparatus 900 for processing timing advance TA of a terminal according to an embodiment of this application. The apparatus 900 may be the terminal in FIG. 1. The apparatus may use a hardware architecture shown in FIG. 9. The apparatus may include a processor 910 and a transceiver 920. Optionally, the apparatus may further include a memory 930. The processor 910, the transceiver 920, and the memory 930 communicate with each other by using an internal connection path. A related function implemented by the processing module 820 in FIG. 8 may be implemented by the processor 910, and a related function implemented by the transceiver module 810 may be implemented by the processor 910 by controlling the transceiver 920.

Optionally, the processor 910 may be a general-purpose central processing unit (CPU), a microprocessor, an application-specific integrated circuit (ASIC), a dedicated processor, or one or more integrated circuits configured to perform the technical solutions in embodiments of this application. Alternatively, the processor may be one or more devices, circuits, and/or processing cores configured to process data (for example, computer program instructions). For example, the processor may be a baseband processor or a central processing unit. The baseband processor may be configured to process a communication protocol and communication data. The central processing unit may be configured to control the apparatus (for example, a base station, a terminal, or a chip) for processing timing advance TA of a terminal, execute a software program, and process data of the software program.

Optionally, the processor 910 may include one or more processors, for example, include one or more central processing units (CPUs). When the processor is one CPU, the CPU may be a single-core CPU, or may be a multi-core CPU.

The transceiver 920 is configured to send data and/or a signal, and receive data and/or a signal. The transceiver may include a transmitter and a receiver. The transmitter is configured to send data and/or a signal, and the receiver is configured to receive data and/or a signal.

The memory 930 includes but is not limited to a random access memory (RAM), a read-only memory (ROM), an erasable programmable read-only memory (EPROM), and a compact disc read-only memory (CD-ROM). The memory 930 is configured to store related instructions and data.

The memory 930 is configured to store program code and data of the terminal, and may be a separate device or integrated into the processor 910.

Specifically, the processor 910 is configured to control the transceiver to perform information transmission with the terminal. For details, refer to the descriptions in the foregoing method embodiments. Details are not described herein again.

During specific implementation, in an embodiment, the apparatus 900 may further include an output device and an input device. The output device communicates with the processor 910, and may display information in a plurality of manners. For example, the output device may be a liquid crystal display (LCD), a light emitting diode (LED) display device, a cathode ray tube (CRT) display device, or a projector. When communicating with the processor 910, the input device may receive an input from a user in a plurality of manners. For example, the input device may be a mouse, a keyboard, a touchscreen device, or a sensor device.

It may be understood that FIG. 9 shows only a simplified design of the apparatus for processing timing advance TA of a terminal. During actual application, the apparatus may further include other necessary components, including but not limited to any quantity of transceivers, processors, controllers, memories, and the like, and all terminals that can implement this application shall fall within the protection scope of this application.

In a possible design, the apparatus 900 may be a chip, for example, may be a communication chip that can be used in the terminal, and is configured to implement a related function of the processor 910 in the terminal. The chip may be a field programmable gate array, a dedicated integrated chip, a system chip, a central processing unit, a network processor, a digital signal processing circuit, or a microcontroller for implementing the related function, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be a terminal or a circuit. The apparatus may be configured to perform an action performed by the terminal in the foregoing method embodiments.

Figure 10:
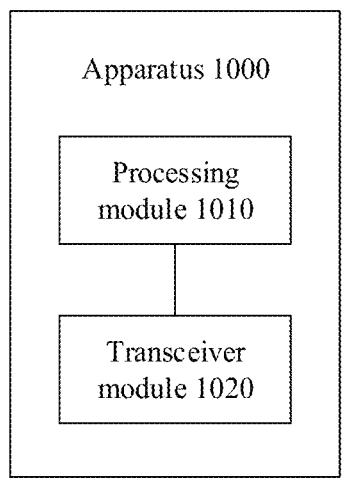
FIG. 10 is a schematic block diagram of a signal transmission apparatus according to another embodiment of this application.

FIG. 10 is a schematic block diagram of an apparatus 1000 for processing timing advance TA of a terminal according to an embodiment of this application.

It should be understood that the apparatus 1000 may correspond to the network device shown in FIG. 1 or a chip in the network device, or the network device in the embodiment shown in FIG. 6 or a chip in the network device, and may have any function of the network device in the method. The apparatus 1000 includes a processing module 1010 and a transceiver module 1020.

The processing module 1010 is configured to determine a correspondence between first TA and a beam or a transmission reception point TRP; and the transceiver module 1020 is configured to send the correspondence.

Optionally, the transceiver module 1020 is further configured to send indication information, where the indication information is used to indicate a beam list corresponding to the first TA, the beam list includes an identifier of at least one beam, or is used to indicate the TRP corresponding to the first TA, and the TRP is associated with at least one beam.

Optionally, the identifier of the beam includes a beam index, a synchronization signal block SSB index, or a channel state information reference signal CSI-RS identifier.

Optionally, the transceiver module 1020 is further configured to receive reason information in a random access process of the terminal, where the reason information is used to indicate a reason for initiating the random access.

Optionally, the reason includes that the first TA is invalid, or that a configured grant resource is cleared.

Optionally, the transceiver module 1020 is further configured to receive the random access request; and send a response message for the random access request, where the response message includes second TA and indication information, and the indication information indicates a beam or a TRP corresponding to the second TA, or a TRP or a beam on which the response message is located is a beam or a TRP corresponding to the second TA.

Optionally, the transceiver module 1020 is further configured to send a broadcast message, where the broadcast message includes a plurality of beam lists or information about a plurality of TRPs, and the indication information is used to indicate one of the plurality of beam lists or one of the plurality of TRPs.

Figure 11:
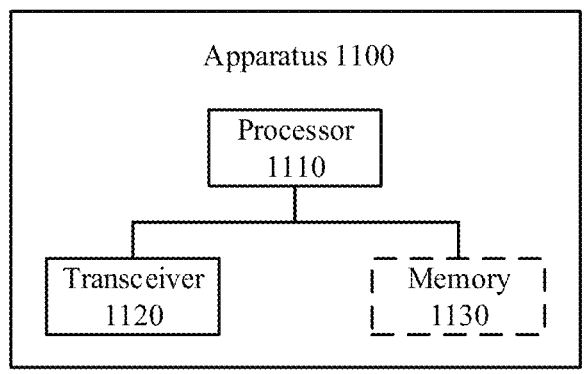
FIG. 11 is a schematic diagram of a structure of a signal transmission apparatus according to an embodiment of this application.

FIG. 11 shows an apparatus 1100 for processing timing advance TA of a terminal according to an embodiment of this application. The apparatus 1100 may be the network device in FIG. 1. The apparatus may use a hardware architecture shown in FIG. 11. The apparatus may include a processor 1110 and a transceiver 1120. Optionally, the apparatus may further include a memory 1130. The processor 1110, the transceiver 1120, and the memory 1130 communicate with each other by using an internal connection path. A related function implemented by the processing module 1010 in FIG. 10 may be implemented by the processor 1110, and a related function implemented by the transceiver module 1020 may be implemented by the processor 1110 by controlling the transceiver 1130.

Optionally, the processor 1110 may be a general-purpose central processing unit (CPU), a microprocessor, an application-specific integrated circuit (ASIC), a dedicated processor, or one or more integrated circuits configured to perform the technical solutions in embodiments of this application. Alternatively, the processor may be one or more devices, circuits, and/or processing cores configured to process data (for example, computer program instructions). For example, the processor may be a baseband processor or a central processing unit. The baseband processor may be configured to process a communication protocol and communication data. The central processing unit may be configured to control the apparatus (for example, a base station, a terminal, or a chip) for processing timing advance TA of a terminal, execute a software program, and process data of the software program.

Optionally, the processor 1110 may include one or more processors, for example, include one or more central processing units (CPUs). When the processor is one CPU, the CPU may be a single-core CPU, or may be a multi-core CPU.

The transceiver 1130 is configured to send data and/or a signal, and receive data and/or a signal. The transceiver may include a transmitter and a receiver. The transmitter is configured to send data and/or a signal, and the receiver is configured to receive data and/or a signal.

The memory 1130 includes but is not limited to a random access memory (RAM), a read-only memory (ROM), an erasable programmable read-only memory (EPROM), and a compact disc read-only memory (CD-ROM). The memory 1130 is configured to store related instructions and data.

The memory 1130 is configured to store program code and data of the terminal, and may be a separate device or integrated into the processor 1110.

Specifically, the processor 1110 is configured to control the transceiver to perform information transmission with the terminal. For details, refer to the descriptions in the foregoing method embodiments. Details are not described herein again.

During specific implementation, in an embodiment, the apparatus 1100 may further include an output device and an input device. The output device communicates with the processor 1110, and may display information in a plurality of manners. For example, the output device may be a liquid crystal display (LCD), a light emitting diode (LED) display device, a cathode ray tube (CRT) display device, or a projector. The input device communicates with the processor 1110, and may receive an input from a user in a plurality of manners. For example, the input device may be a mouse, a keyboard, a touchscreen device, or a sensor device.

It may be understood that FIG. 11 shows only a simplified design of the apparatus for processing timing advance TA of a terminal. During actual application, the apparatus may further include other necessary components, including but not limited to any quantity of transceivers, processors, controllers, memories, and the like, and all terminals that can implement this application shall fall within the protection scope of this application.

In a possible design, the apparatus 1100 may be a chip, for example, may be a communication chip that can be used in the terminal, and is configured to implement a related function of the processor 1110 in the terminal. The chip may be a field programmable gate array, a dedicated integrated chip, a system chip, a central processing unit, a network processor, a digital signal processing circuit, or a microcontroller for implementing the related function, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be a terminal or a circuit. The apparatus may be configured to perform an action performed by the terminal in the foregoing method embodiments.

Figure 12:
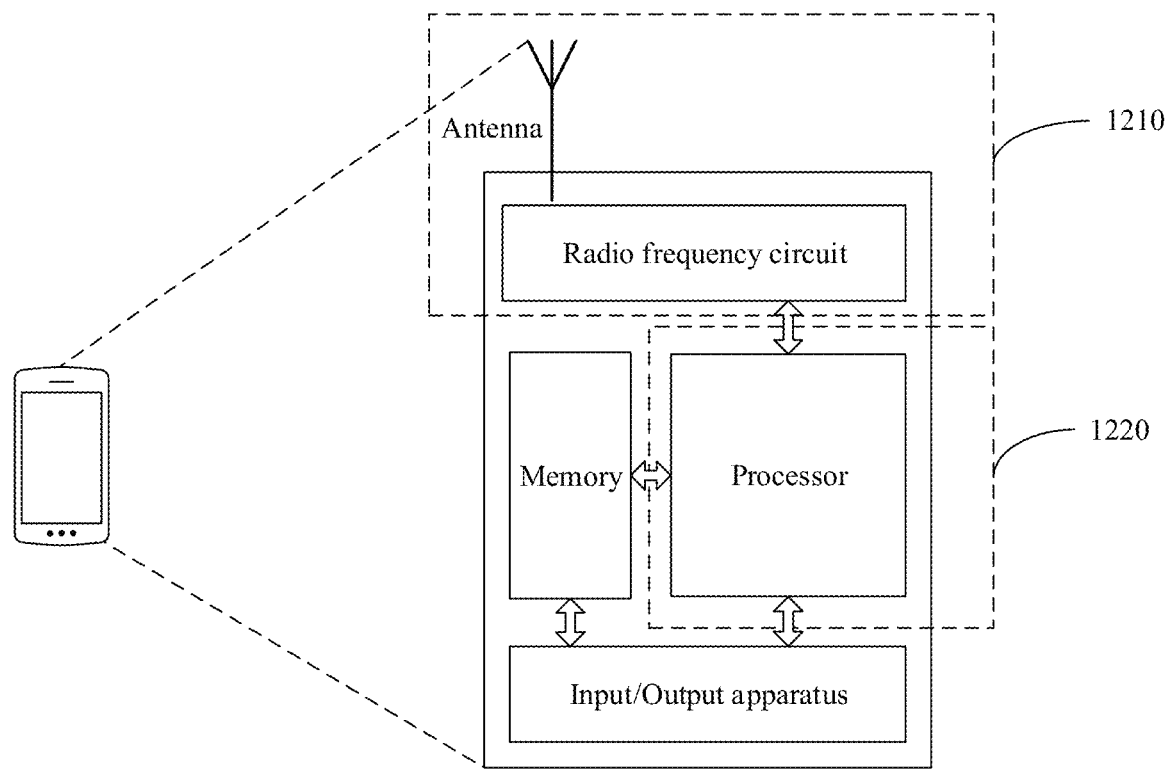
FIG. 12 is a schematic diagram of a structure of a signal transmission apparatus according to an embodiment of this application.

Optionally, when the apparatus in this embodiment is a terminal, FIG. 12 is a schematic diagram of a simplified structure of a terminal. For ease of understanding and illustration, in FIG. 12, a mobile phone is used as an example of the terminal. As shown in FIG. 12, the terminal includes a processor, a memory, a radio frequency circuit, an antenna, and an input/output apparatus. The processor is mainly configured to process a communication protocol and communication data, control the terminal, execute a software program, process data of the software program, and the like. The memory is mainly configured to store the software program and data. The radio frequency circuit is mainly configured to perform conversion between a baseband signal and a radio frequency signal, and process the radio frequency signal. The antenna is mainly configured to transmit and receive a radio frequency signal in an electromagnetic wave form. The input/output apparatus, such as a touchscreen, a display, or a keyboard, is mainly configured to receive data entered by a user, and output data to the user. It should be noted that some types of terminals may not include the input/output apparatus.

When data needs to be sent, the processor performs baseband processing on the to-be-sent data, and then outputs a baseband signal to the radio frequency circuit. After performing radio frequency processing on the baseband signal, the radio frequency circuit sends a radio frequency signal in an electromagnetic wave form by using the antenna. When data is sent to the terminal, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 12 shows only one memory and one processor. In an actual terminal product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have a transceiver function may be considered as a transceiver unit of the terminal, and the processor that has a processing function may be considered as a processing unit of the terminal. As shown in FIG. 12, the terminal includes a transceiver unit 1210 and a processing unit 1220. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1210 and that is configured to implement a receiving function may be considered as a receiving unit, and a component that is in the transceiver unit 1210 and that is configured to implement a sending function may be considered as a sending unit. In other words, the transceiver unit 1210 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiver circuit, or the like. The sending unit sometimes may also be referred to as a transmitter machine, a transmitter, a transmitting circuit, or the like.

It should be understood that the transceiver unit 1210 is configured to perform a sending operation and a receiving operation on a terminal side in the foregoing method embodiments, and the processing unit 1220 is configured to perform an operation other than the receiving/sending operation of the terminal in the foregoing method embodiments.

For example, in an implementation, the processing unit 1220 is configured to perform the processing steps 401 to 403 on the terminal side in FIG. 6. The transceiver unit 1210 is configured to perform the receiving/sending operation, and/or the transceiver unit 1210 is further configured to perform other sending and receiving steps on the terminal side in embodiments of this application.

When the apparatus is a chip, the chip includes a transceiver unit and a processing unit. The transceiver unit may be an input/output circuit or a communication interface. The processing unit is a processor, a microprocessor, or an integrated circuit integrated on the chip.

Figure 13:
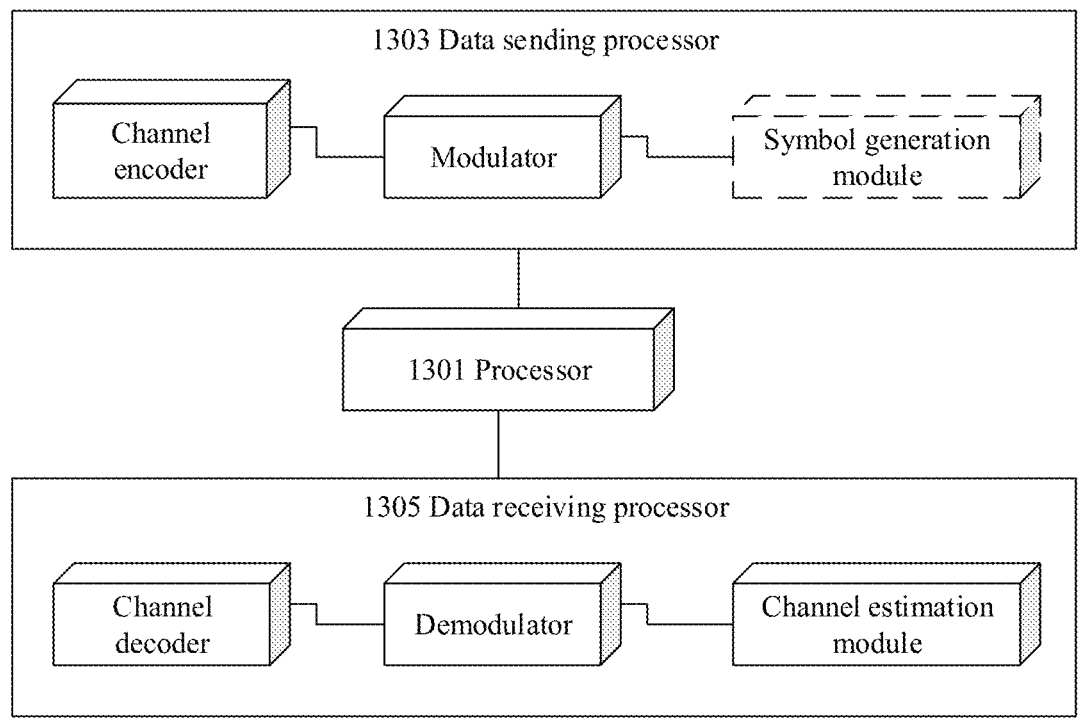
FIG. 13 is a schematic diagram of a structure of a signal transmission apparatus according to another embodiment of this application.

Optionally, when the apparatus is a terminal, reference may further be made to a device shown in FIG. 13. In an example, the device may implement a function similar to that of the processor 910 in FIG. 9. In FIG. 13, the device includes a processor 1301, a data sending processor 1303, and a data receiving processor 1305. The processing module 820 in the foregoing embodiment shown in FIG. 8 may be the processor 1301 in FIG. 13, and completes a corresponding function. The transceiver module 810 in the foregoing embodiment shown in FIG. 8 may be the data sending processor 1303 and the data receiving processor 1305 in FIG. 13. Although FIG. 13 shows a channel encoder and a channel decoder, it may be understood that these modules are merely examples, and do not constitute a limitation on this embodiment.

Figure 14:
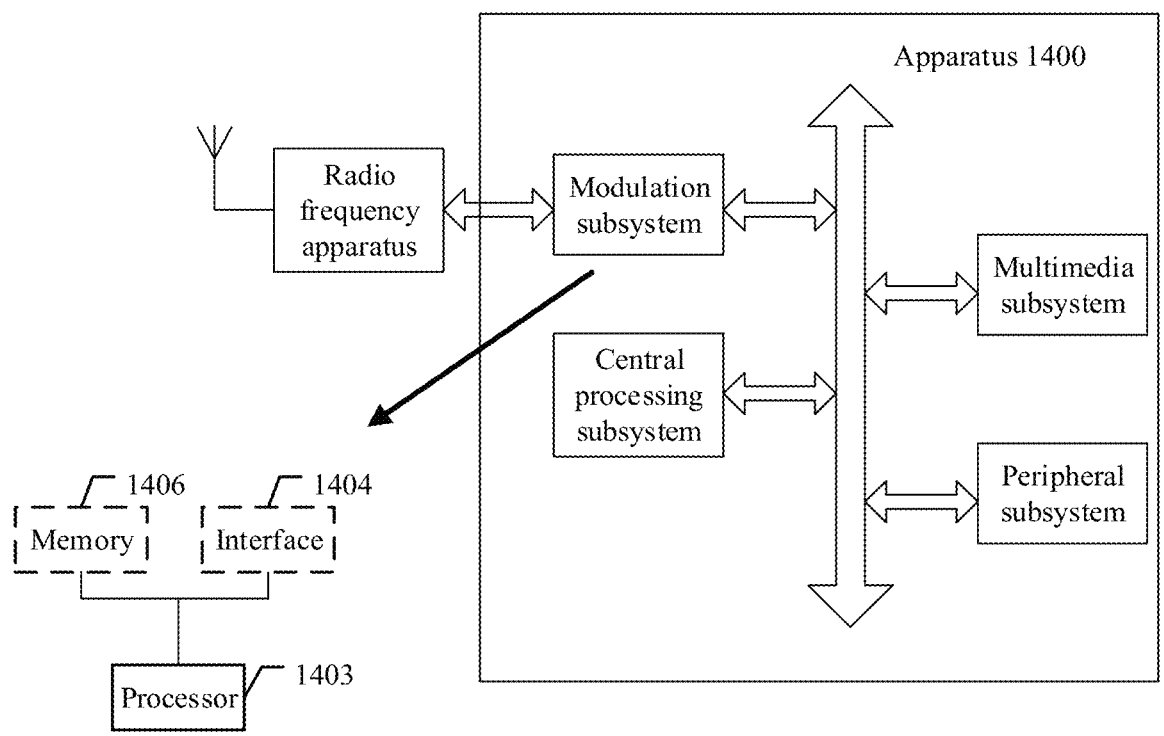
FIG. 14 is a schematic diagram of a structure of a signal transmission apparatus according to another embodiment of this application.

FIG. 14 shows another form of this embodiment. A processing apparatus 1400 includes modules such as a modulation subsystem, a central processing subsystem, and a peripheral subsystem. A communication device in this embodiment may be used as the modulation subsystem in the apparatus. Specifically, the modulation subsystem may include a processor 1403 and an interface 1404. The processor 1403 implements a function of the processing module 820, and the interface 1404 implements a function of the transceiver module 810. In another variation, the modulation subsystem includes a memory 1406, the processor 1403, and a program that is stored in the memory and that is executable in the processor. When the program is executed by the processor, the methods in embodiments are implemented. It should be noted that the memory 1406 may be nonvolatile or volatile. The memory 1406 may be located inside the modulation subsystem, or may be located in the processing apparatus 1400, provided that the memory 1406 can be connected to the processor 1403.

Figure 15:
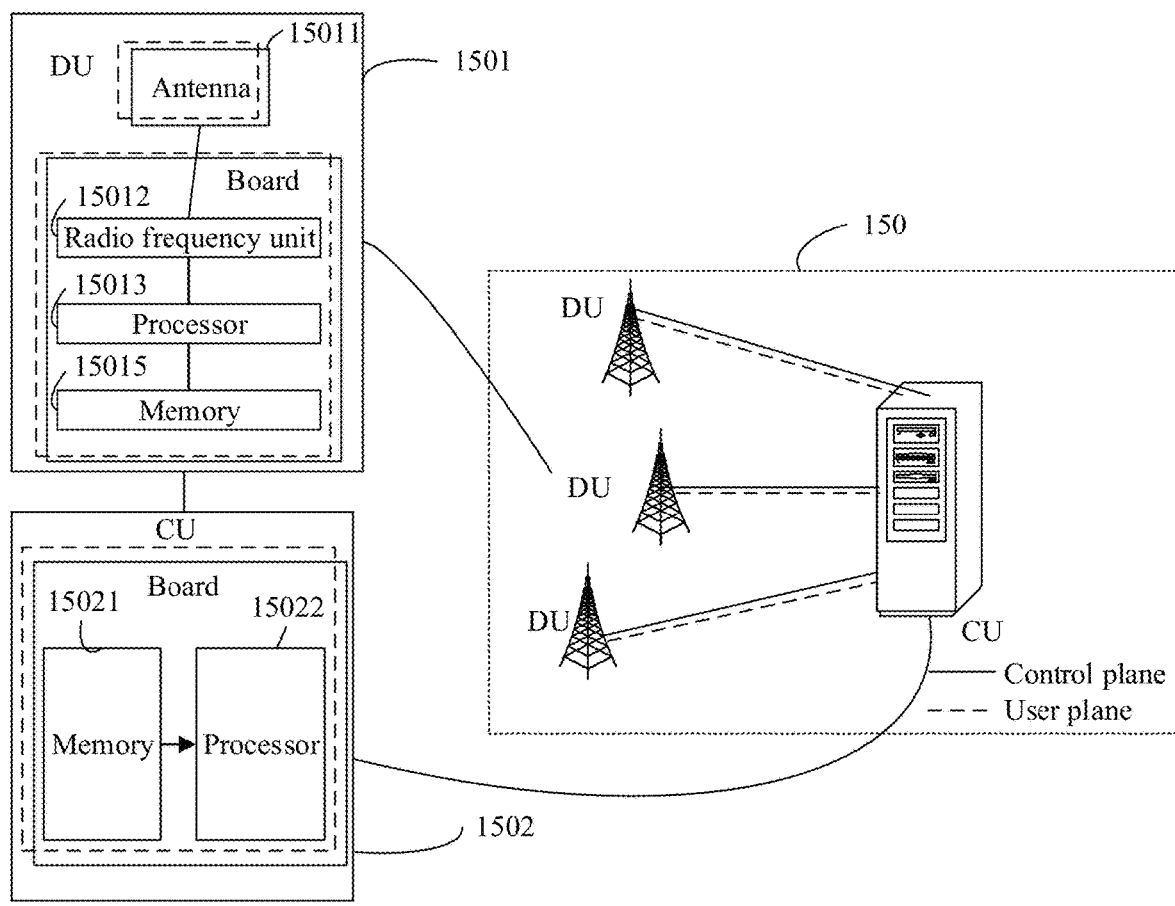
FIG. 15 is a schematic diagram of a structure of a signal transmission apparatus according to another embodiment of this application.

When the apparatus in this embodiment is a network device, the network device may be shown in FIG. 15. For example, an apparatus 150 is a base station. The base station may be used in the system shown in FIG. 1, to perform a function of the network device in the foregoing method embodiments. The base station 150 may include one or more DUs 1501 and one or more CUs 1502. The CU 1502 may communicate with a next-generation core network (NC).

The DU 1501 may include at least one antenna 15011, at least one radio frequency unit 15012, at least one processor 15013, and at least one memory 15015. The DU 1501 is mainly configured to receive and send a radio frequency signal, convert a radio frequency signal and a baseband signal, and perform some baseband processing. The CU 1502 may include at least one processor 15022 and at least one memory 15021. The CU 1502 and the DU 1501 may communicate by using an interface. A control plane interface may be Fs-C, for example, F1-C, and a user plane interface may be Fs-U, for example, F1-U.

The CU 1502 is mainly configured to perform baseband processing, control the base station, and the like. The DU 1501 and the CU 1502 may be physically disposed together, or may be physically separated, that is, in a distributed base station. The CU 1502 is a control center of the base station, may also be referred to as a processing unit, and is mainly configured to complete a baseband processing function. For example, the CU 1502 may be configured to control the base station to perform an operation procedure related to the network device in the foregoing method embodiments.

Specifically, baseband processing on the CU and the DU may be divided based on protocol layers of a wireless network. For example, functions of a packet data convergence protocol (PDCP) layer and a protocol layer above the PDCP layer are set in the CU. Functions of protocol layers below the PDCP layer, such as a radio link control (RLC) layer and a media access control (MAC) layer, are set in the DU. For another example, the CU implements functions of a radio resource control (RRC) layer and a packet data convergence protocol (PDCP) layer. The DU implements functions of a radio link control (RLC) layer, a MAC layer, and a physical (PHY) layer.

In addition, optionally, the base station 150 may include one or more radio frequency units (RU), one or more DUs, and one or more CUs. The DU may include at least one processor 15013 and at least one memory 15015, the RU may include at least one antenna 15011 and at least one radio frequency unit 15012, and the CU may include at least one processor 15022 and at least one memory 15021.

In an example, the CU 1502 may include one or more boards, and a plurality of boards may jointly support a radio access network (for example, a 5G network) of a single access standard, or may separately support radio access networks (such as an LTE network, a 5G network, or another network) of different access standards. The memory 15021 and the processor 15022 may serve one or more boards. In other words, a memory and a processor may be disposed on each board. Alternatively, a plurality of boards may share a same memory and a same processor. In addition, a necessary circuit may further be disposed on each board. The DU 1501 may include one or more boards, and a plurality of boards may jointly support a radio access network (for example, a 5G network) of a single access standard, or may separately support radio access networks (such as an LTE network, a 5G network, or another network) of different access standards. The memory 15014 and the processor 15013 may serve one or more boards. In other words, a memory and a processor may be disposed on each board. Alternatively, a plurality of boards may share a same memory and a same processor. In addition, a necessary circuit may further be disposed on each board.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be understood that, the processor may be an integrated circuit chip, and has a signal processing capability. In an implementation process, steps in the foregoing method embodiments may be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform methods, steps, and logical block diagrams disclosed in the embodiment of this application. The general-purpose processor may be a microprocessor, or the processor may be any conventional processor, or the like. Steps of the methods disclosed with reference to embodiments of this application may be directly executed and accomplished by a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

In this application, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "/" generally represents an "or" relationship between the associated objects. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

It should be understood that "one embodiment" or "an embodiment" mentioned in the entire specification does not mean that particular features, structures, or characteristics related to the embodiment are included in at least one embodiment of the present invention. Therefore, "in one embodiment" or "in an embodiment" appearing throughout this specification does not refer to a same embodiment. In addition, these particular features, structures, or characteristics may be combined in one or more embodiments in any appropriate manner. It should be understood that sequence numbers of the foregoing processes do not mean execution sequences in embodiments of the present invention. The execution sequences of the processes should be determined according to functions and internal logic of the processes, and should not be construed as any limitation on the implementation processes of embodiments of the present invention.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that are run on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to a signal having one or more data packets (for example, data from two components interacting with another component in a local system, a distributed system, and/or across a network such as the Internet interacting with other systems by using the signal).

It should further be understood that "first", "second", and various numerical symbols in this specification are merely used for distinguishing for ease of description, and are not intended to limit the scope of embodiments of this application.

It should be understood that the term "and/or" in this specification describes only an association relationship for describing associated objects and represents that three relationships may exist. For example, A and/or B may represent the following three cases: Only A exists, both A and B exist, and only B exists. When only A or only B exists, a quantity of A or B is not limited. In an example in which only A exists, it may be understood as that there is one or more A.

A person of ordinary skill in the art may be aware that units and algorithm steps in the examples described with reference to embodiments disclosed in this specification can be implemented by electronic hardware or a combination of computer software and electronic hardware. Whether the functions are executed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, the apparatus, and the method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions in this application essentially, or a part contributing to an existing technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for processing timing advance (TA) of a terminal, the method comprising:
   obtaining, by the terminal, a correspondence between a first TA and a beam or a transmission reception point (TRP);
   determining, by the terminal and based on the correspondence, the beam or the TRP associated with the first TA;
   determining, by the terminal, that the terminal has moved out of coverage of the TRP or the beam associated with the first TA in response to one of the following:
      a signal quality of the beam associated with the first TA being less than or equal to a preset threshold, wherein the first TA is associated with at least one beam;
      a quantity of beams whose signal quality is greater than or equal to the preset threshold in a plurality of beams associated with the first TA being less than or equal to N, wherein N is a positive integer;
      a quantity of beams whose signal quality is less than the preset threshold in the plurality of beams associated with the first TA being greater than or equal to L, wherein L is a positive integer;
      an average value of first S pieces of signal quality obtained by sorting, in descending order, signal quality of the plurality of beams associated with the first TA being less than or equal to the preset threshold, wherein S is a positive integer;
      a signal quality of the beam associated with the TRP associated with the first TA being less than or equal to a preset threshold, wherein the beam associated with the TRP is at least one beam;
      a quantity of beams whose signal quality is greater than or equal to the preset threshold in a plurality of beams associated with the TRP which is associated with the first TA being less than or equal to N, wherein N is an integer; and
      a quantity of beams whose signal quality is less than or equal to the preset threshold in the plurality of beams associated with the TRP which is associated with the first TA being greater than or equal to L, wherein L is a positive integer; and
      an average value of first S pieces of signal quality sorted in descending order of signal quality in the plurality of beams associated with the TRP which is associated with the first TA being less than or equal to the preset threshold, wherein S is a positive integer; and
   determining, by the terminal, the first TA is invalid in response to determining the terminal has moved out of coverage of the beam or the TRP associated with the first TA.

2. The method according to claim 1, wherein determining whether the TA is invalid comprises determining that the first TA is invalid in response to one of the following:
   a variation of signal quality of a plurality of beams associated with the first TA or associated with the TRP, which is associated with the first TA, being greater than a first preset threshold;
   there being another beam whose signal quality is greater than the signal quality of the beam associated with the first TA or associated with the TRP, which is associated with the first TA; and there being another beam whose signal quality is greater than or equal to a second preset threshold.

3. The method according to claim 2, further comprising determining a variation of the signal quality of the beam associated with the first TA is greater than the first preset threshold in response to one of the following:
a variation of a difference between signal quality of a first beam in the plurality of beams associated with the first TA or the plurality of beams associated with the TRP, which is associated with the first TA, and signal quality of a second beam being greater than or equal to the first preset threshold; and
a variation of the signal quality of the first beam in the plurality of beams associated with the first TA or the plurality of beams associated with the TRP, which is associated with the first TA, being greater than or equal to the first preset threshold.

4. The method according to claim 1, further comprising receiving, by the terminal, indication information that indicates:
a beam list associated with the first TA, wherein the beam list comprises an identifier of at least one beam, or
the TRP associated with the first TA, wherein the TRP is associated with at least one beam.

5. The method according to claim 4, wherein the identifier of the beam comprises a beam index, a synchronization signal block (SSB) index, or a channel state information reference signal (CSI-RS) identifier.

6. The method according to claim 1, further comprising sending, by the terminal, reason information in a random access process of the terminal, wherein the reason information indicates a reason for initiating the random access.

7. The method according to claim 6, wherein the reason information comprises information indicating the first TA is invalid, or that a configured grant resource is cleared.

8. The method according to claim 6, further comprising:
sending, by the terminal, a random access request; and
receiving, by the terminal, a response message for the random access request, wherein the response message comprises a second TA and indication information, and wherein the indication information indicates a beam or a TRP associated with the second TA.

9. The method according to claim 8, wherein the beam or the TRP associated with the second TA as indicated by the indication information is a TRP or a beam on which the response message is located.

10. The method according to claim 1 further comprising receiving, by the terminal, a broadcast message comprising a plurality of beam lists or information about a plurality of TRPs, wherein the indication information indicates one of the plurality of beam lists or one of the plurality of TRPs.

11. An apparatus applied for a compression end, the apparatus comprising:
at least one processor, and a memory coupled to the at least one processor and storing instructions for execution by the at least one processor;
wherein the instructions are executed by the at least one processor and cause the apparatus to perform operations comprising:
obtaining a correspondence between a first timing advance (TA) and a beam or a transmission reception point (TRP);
determining, based on the correspondence, the beam or the TRP associated with the first TA;
determining that the apparatus has moved out of coverage of the TRP or the beam associated with the first TA in response to one of the following:
a signal quality of the beam associated with the first TA being less than or equal to a preset threshold, wherein the first TA is associated with at least one beam;
a quantity of beams whose signal quality is greater than or equal to the preset threshold in a plurality of beams associated with the first TA being less than or equal to N, wherein N is a positive integer;
a quantity of beams whose signal quality is less than the preset threshold in the plurality of beams associated with the first TA being greater than or equal to L, wherein L is a positive integer;
an average value of first S pieces of signal quality obtained by sorting, in descending order, signal quality of the plurality of beams associated with the first TA being less than or equal to the preset threshold, wherein S is a positive integer;
a signal quality of the beam associated with the TRP associated with the first TA being less than or equal to a preset threshold, wherein the beam associated with the TRP is at least one beam;
a quantity of beams whose signal quality is greater than or equal to the preset threshold in a plurality of beams associated with the TRP which is associated with the first TA being less than or equal to N, wherein N is an integer;
a quantity of beams whose signal quality is less than or equal to the preset threshold in the plurality of beams associated with the TRP which is associated with the first TA being greater than or equal to L, wherein L is a positive integer; and
an average value of first S pieces of signal quality sorted in descending order of signal quality in the plurality of beams associated with the TRP which is associated with the first TA being less than or equal to the preset threshold, wherein S is a positive integer; and
determining the first TA is invalid in response to determining the apparatus has moved out of coverage of the beam or the TRP associated with the first TA.

12. The apparatus according to claim 11, wherein determining whether the TA is invalid comprises determining that the first TA is invalid in response to one of the following:
a variation of signal quality of a plurality of beams associated with the first TA or associated with the TRP, which is associated with the first TA, being greater than a first preset threshold;
there being another beam whose signal quality is greater than the signal quality of the beam associated with the first TA or associated with the TRP, which is associated with the first TA; and
there being another beam whose signal quality is greater than or equal to a second preset threshold.

13. The apparatus according to claim 12, further comprising determining a variation of the signal quality of the beam associated with the first TA is greater than the first preset threshold in response to one of the following:
a variation of a difference between signal quality of a first beam in the plurality of beams associated with the first TA or the plurality of beams associated with the TRP, which is associated with the first TA, and signal quality of a second beam being greater than or equal to the first preset threshold; and
a variation of the signal quality of the first beam in the plurality of beams associated with the first TA or the plurality of beams associated with the TRP, which is associated with the first TA, being greater than or equal to the first preset threshold.

14. The apparatus according to claim 11, wherein the operation of obtaining the correspondence between the first TA and the beam or the TRP comprises obtaining the correspondence from a network device.

15. An apparatus applied for a compression end, the apparatus comprising:
- at least one processor, and a memory coupled to the at least one processor and storing instructions for execution by the at least one processor;
- wherein the instructions are executed by the at least one processor and cause the apparatus to perform operations comprising:
  - determining a correspondence between a first timing advance (TA) and a beam or a transmission reception point (TRP);
  - sending the correspondence to a terminal;
  - receiving a random access request from the terminal that includes reason information for use in determining a second TA; and
  - sending a response message for the random access request to the terminal, wherein the response message comprises the second TA and indication information,
    - wherein the indication information indicates a beam or a TRP associated with the second TA.

16. The apparatus according to claim 15, wherein the operations comprise sending indication information that indicates:
- a beam list associated with the first TA, wherein the beam list comprises an identifier of at least one beam, or
- the TRP associated with the first TA, wherein the TRP is associated with at least one beam.

17. The apparatus according to claim 16, wherein the identifier of the beam comprises a beam index, a synchronization signal block (SSB) index, or a channel state information reference signal (CSI-RS) identifier.

18. The apparatus according to claim 15, wherein the reason information comprises that the first TA is invalid, or that a configured grant resource is cleared.

19. The apparatus according to claim 15, wherein the beam or the TRP associated with the second TA as indicated by the indication information is a TRP or a beam on which the response message is located.

20. The apparatus according to claim 15, wherein the operations comprise sending a broadcast message comprising a plurality of beam lists or information about a plurality of TRPs, and wherein the indication information indicates one of the plurality of beam lists or one of the plurality of TRPs.

* * * * *